United States Patent [19]

Sawko et al.

[11] Patent Number: 5,451,448
[45] Date of Patent: Sep. 19, 1995

[54] FLEXIBLE CERAMIC THERMAL PROTECTION SYSTEM RESISTANT TO HIGH AEROACOUSTIC NOISE COMPRISING A THREE-DIMENSIONAL WOVEN-FIBER STRUCTURE HAVING A MULTILAYER TOP FABRIC LAYER, A BOTTOM FABRIC LAYER AND AN INTERMEDIATE RIB FABRIC LAYER

[75] Inventors: Paul M. Sawko, San Jose; Dominic P. Calamito, Redondo Beach; Anthony Jong, Downey, all of Calif.

[73] Assignee: The United States of America as represented by the United States National Aeronautics and Space Administration, Washington, D.C.

[21] Appl. No.: 85,387

[22] Filed: Jul. 1, 1993

[51] Int. Cl.⁶ .......................... B32B 3/28; B32B 7/00; D03D 3/00; B64G 1/00
[52] U.S. Cl. .................. 428/175; 139/384 R; 244/158 A; 428/184; 428/220; 428/229; 428/252; 428/257; 428/301; 428/902
[58] Field of Search .............. 428/174, 175, 178, 184, 428/229, 232, 902, 920; 139/384 R; 244/158 A

[56] References Cited

U.S. PATENT DOCUMENTS

| | | | |
|---|---|---|---|
| 5,080,142 | 1/1992 | Calamito et al. | 139/384 R |
| 5,080,306 | 1/1992 | Porter et al. | 244/158 A |
| 5,277,959 | 1/1994 | Kourtides et al. | 428/116 |

*Primary Examiner*—James D. Withers
*Attorney, Agent, or Firm*—Kenneth L. Warsh; Guy Miller; John G. Mannix

[57] ABSTRACT

Sewn, quilted ceramic blankets (AFRSI) and integrally woven core insulation systems (TABI) were examined in a 170 decibel aeroacoustic environment under oscillating air loads. Preconditioning in a radiant heat source was done at both 2000° F. and 2500° F. before testing. A multi-layer ceramic weave construction based on an angle interlock weave architecture is superior over all other TPS systems examined. These configurations do not require a surface coating to enhance survivability. Single-ply TABI fabric surfaces using an insulated integrally woven core structure survive up to 2000° F. without the use of a ceramic coating to toughen the surface to the aeroacoustic noise level. AFRSI blankets of the art require a ceramic coating in order to demonstrate comparable performance after exposure to a 2000° F. radiant heat temperature.

16 Claims, 17 Drawing Sheets

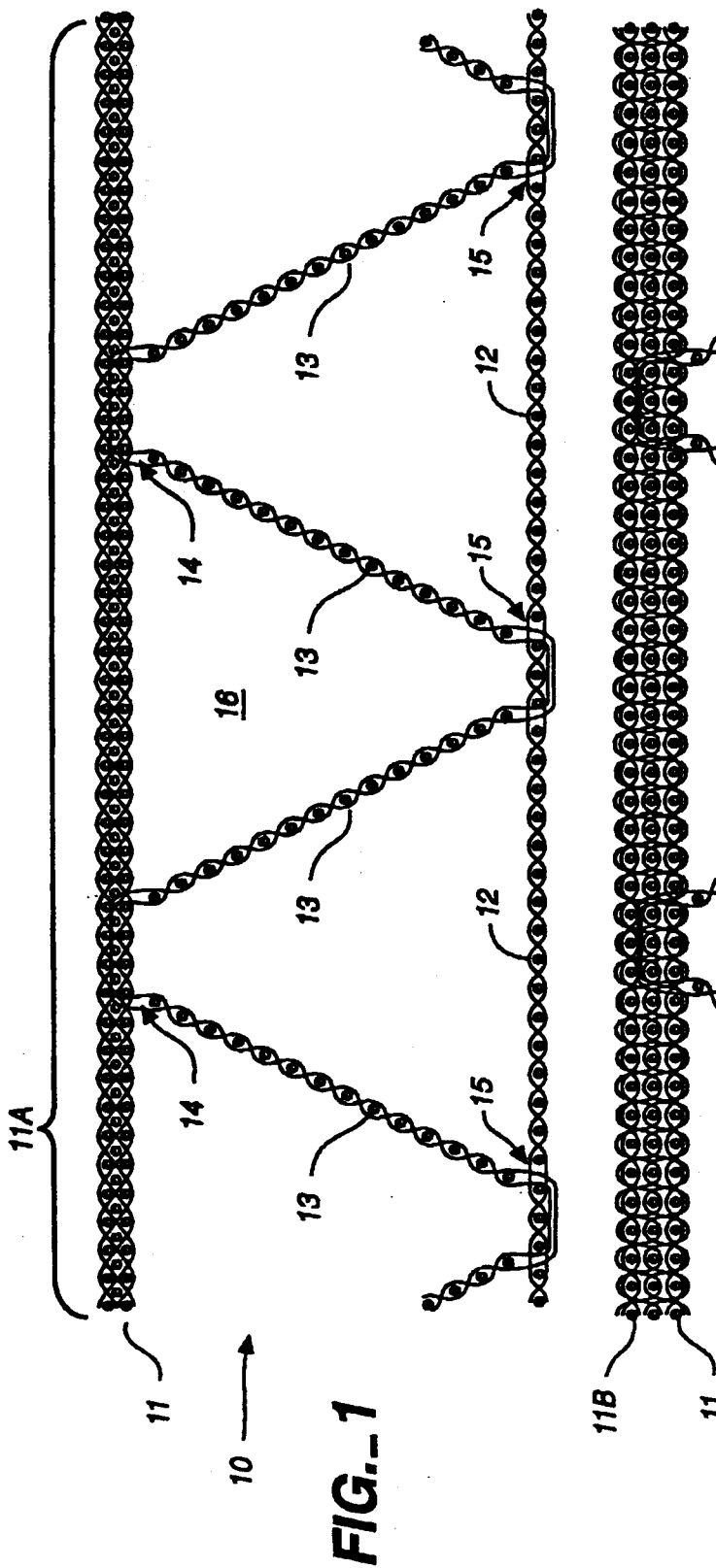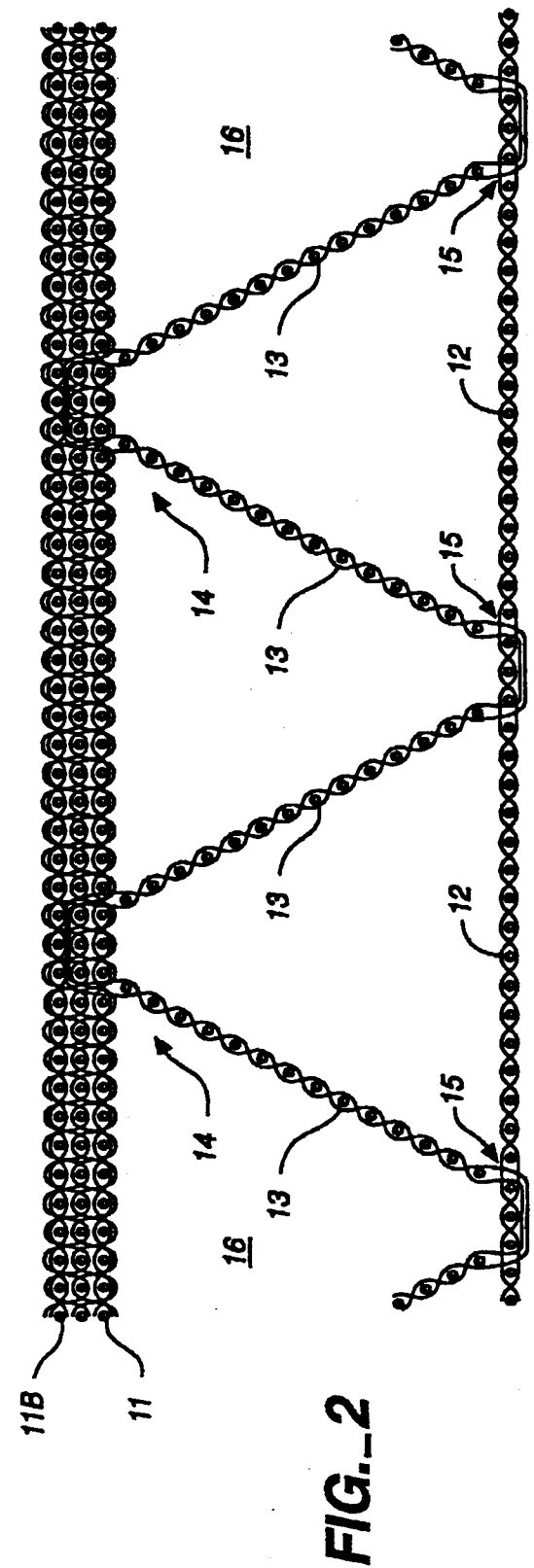

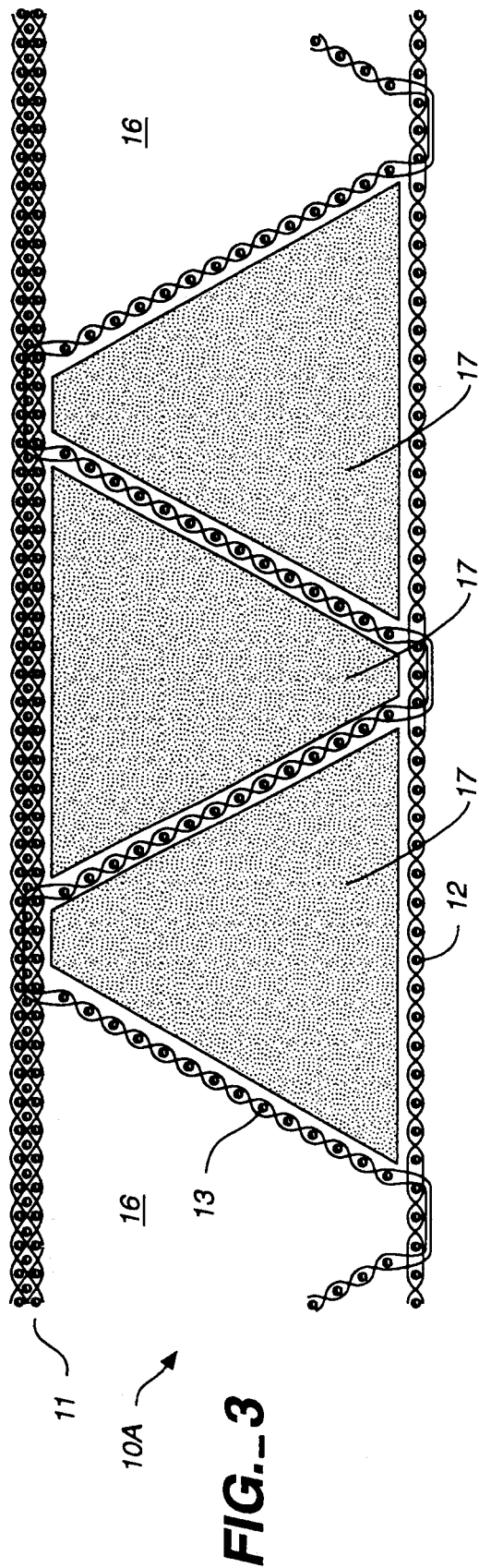
FIG._3
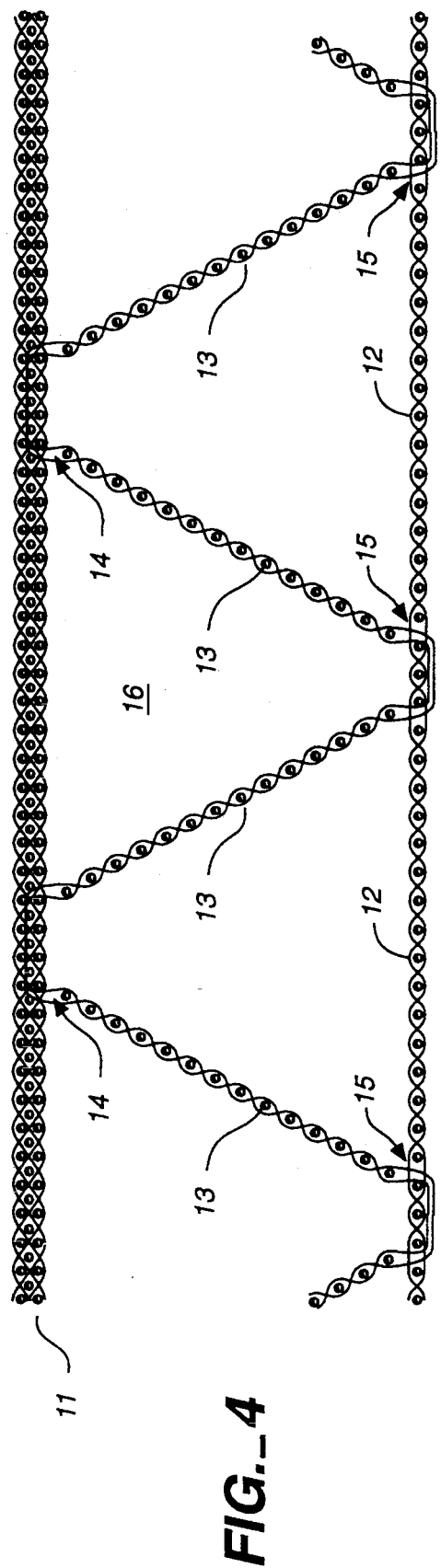
FIG._4

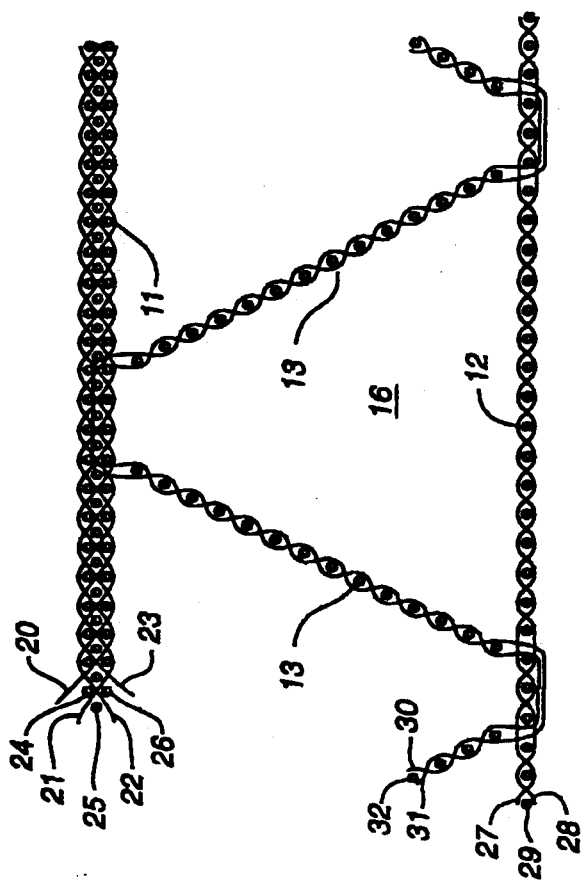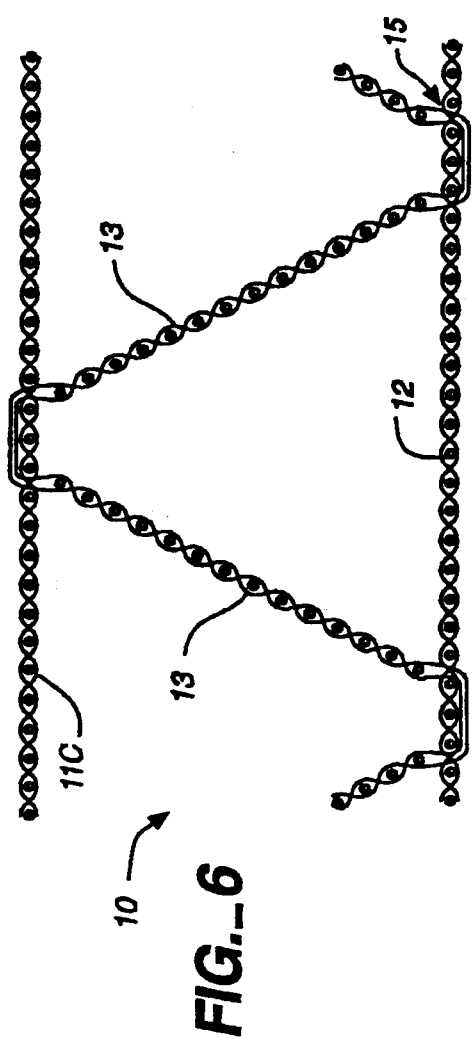

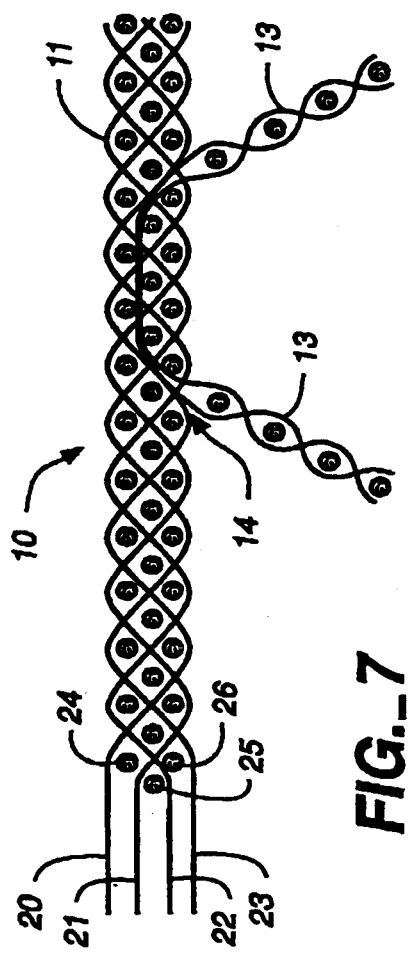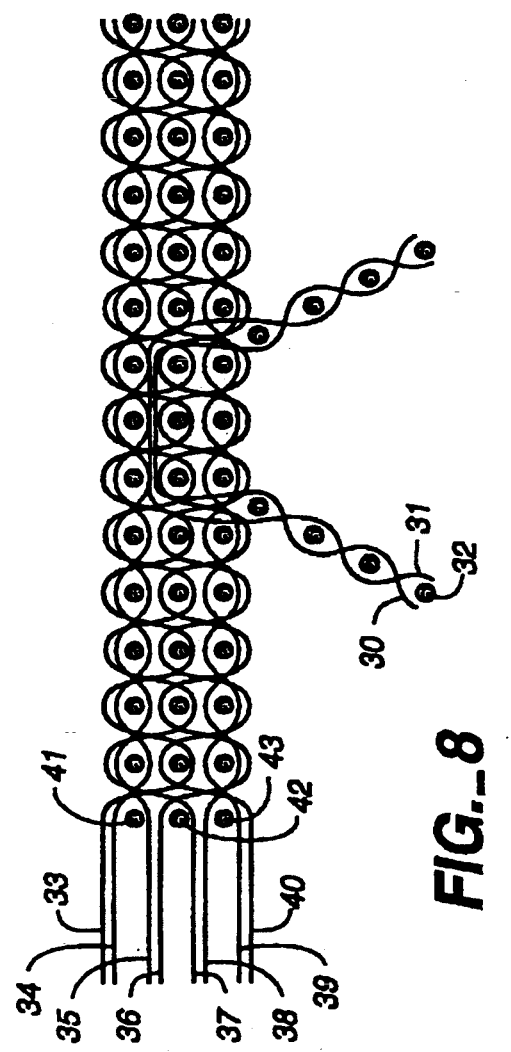

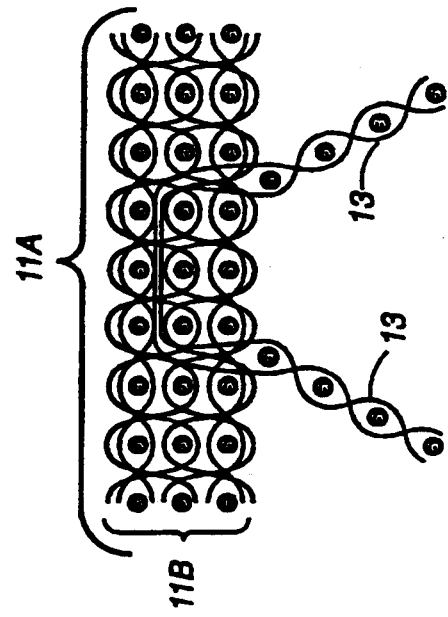
FIG._9B
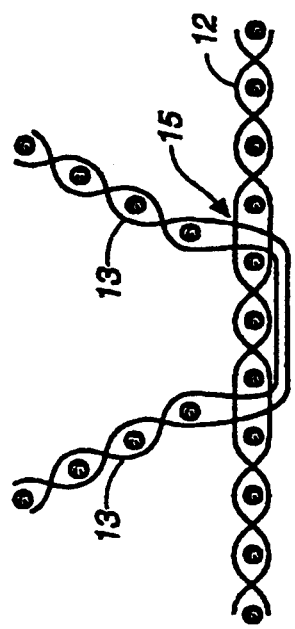
FIG._9C
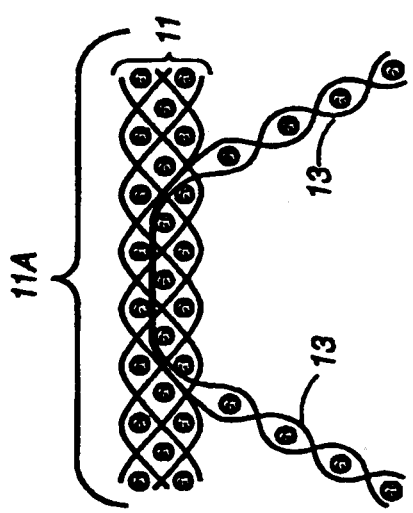
FIG._9A

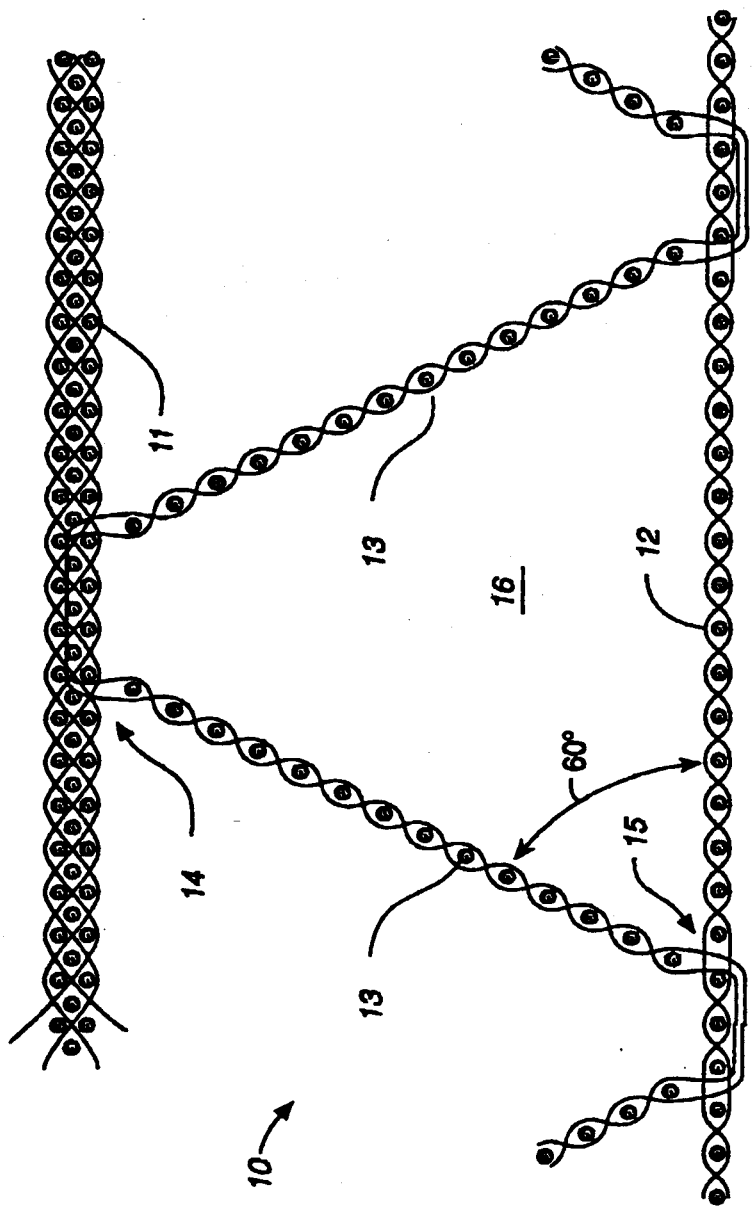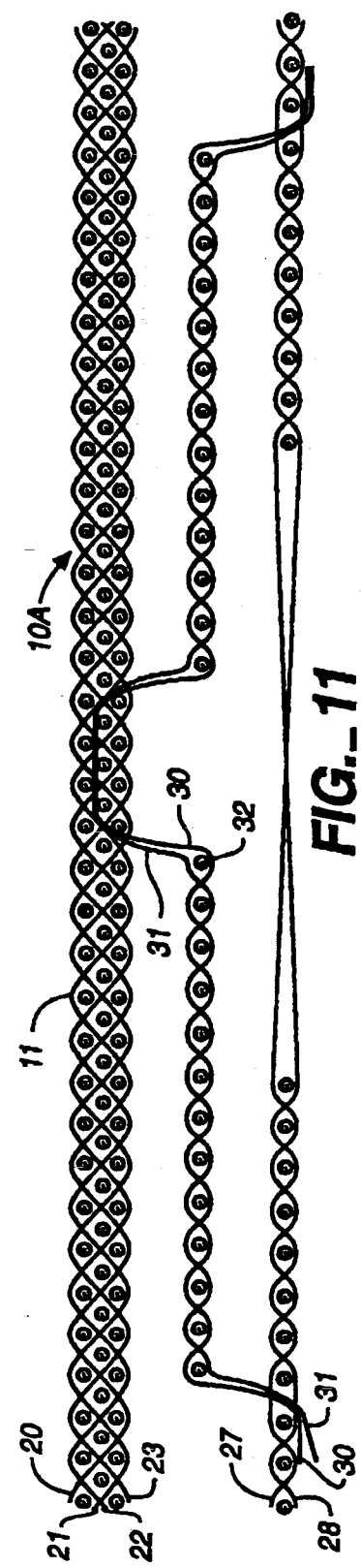

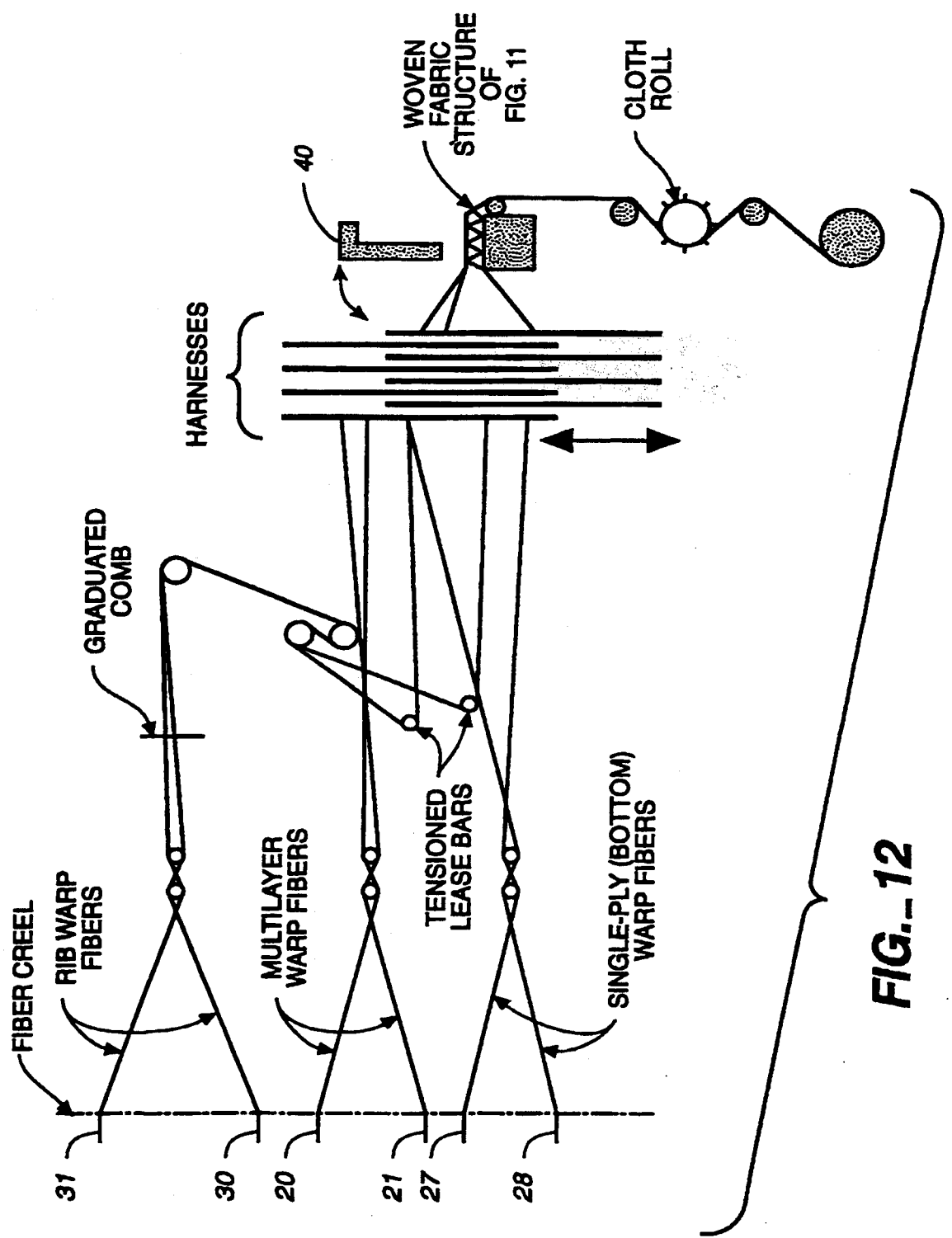

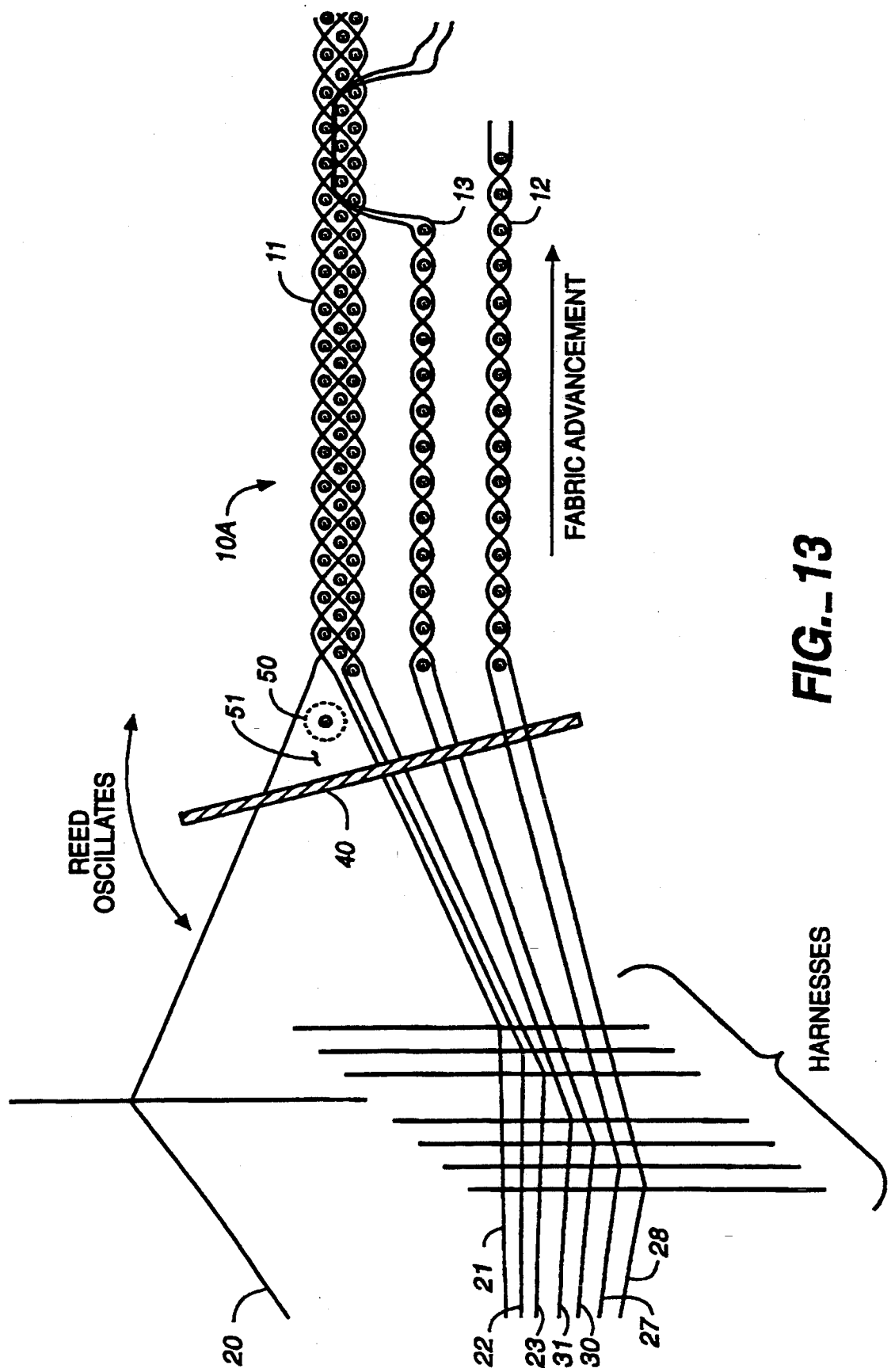

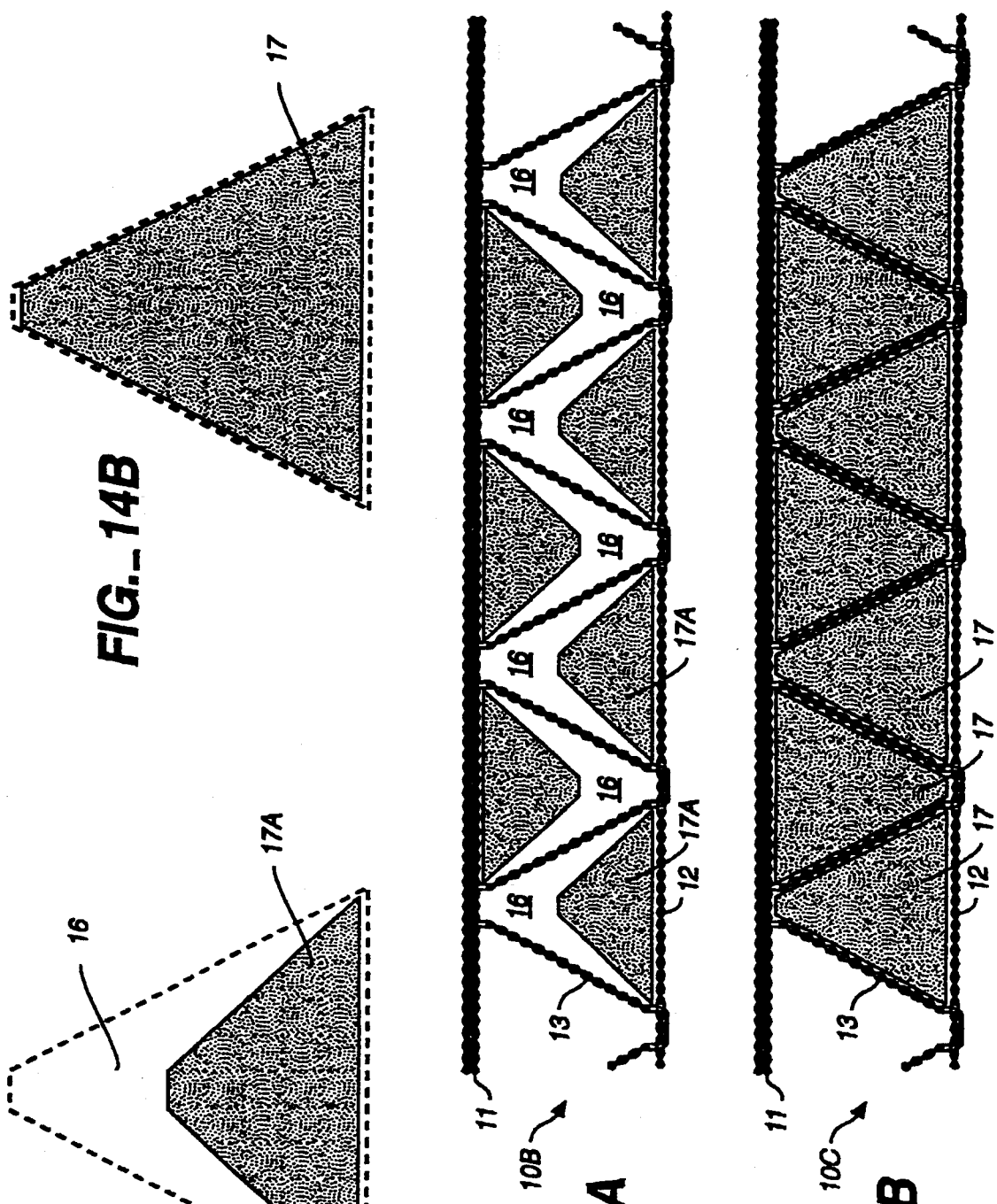

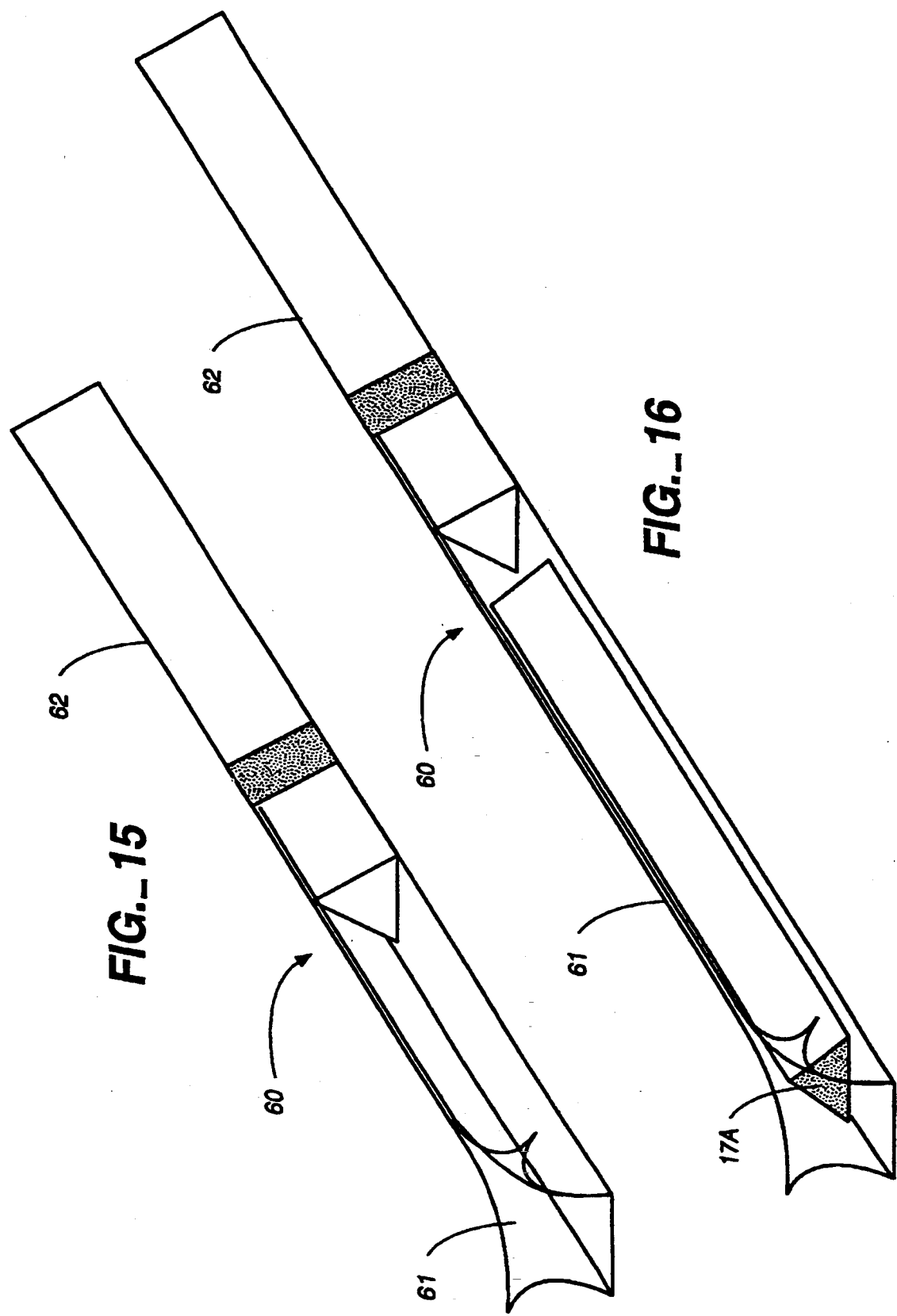

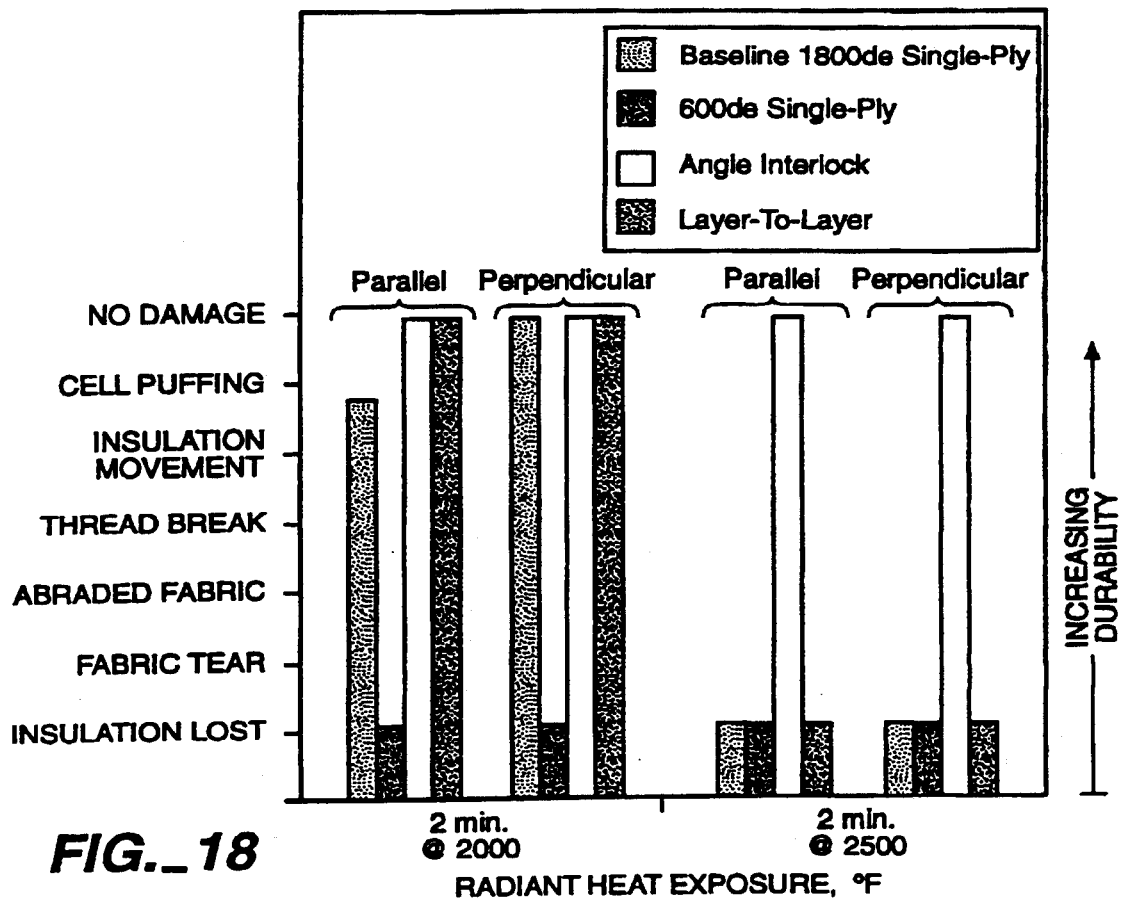
FIG._18
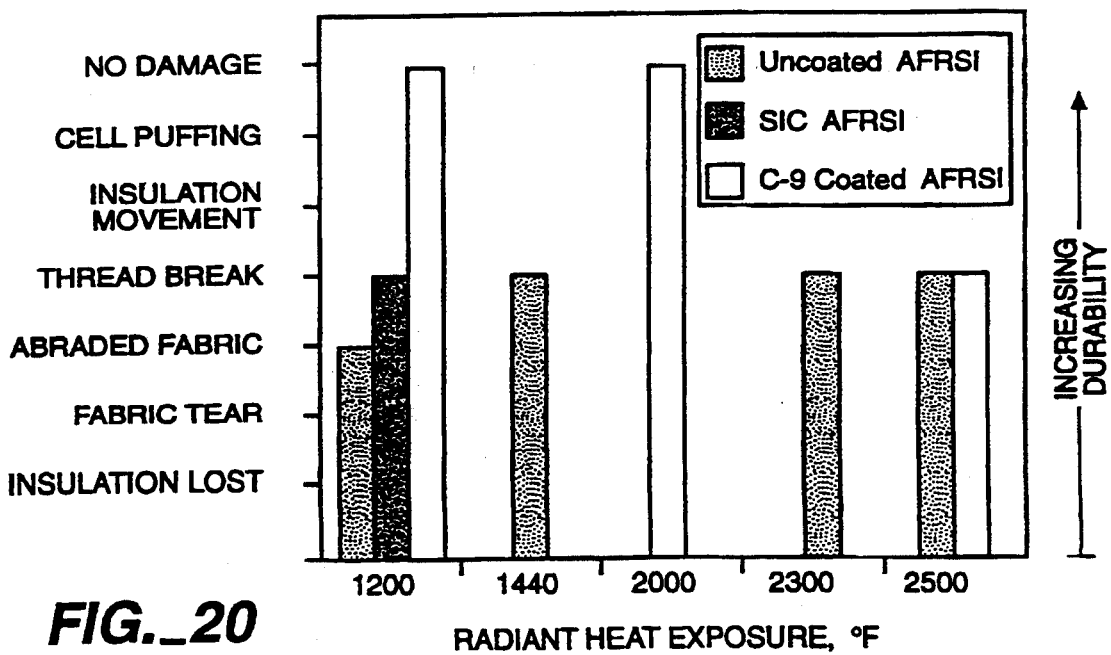
FIG._20

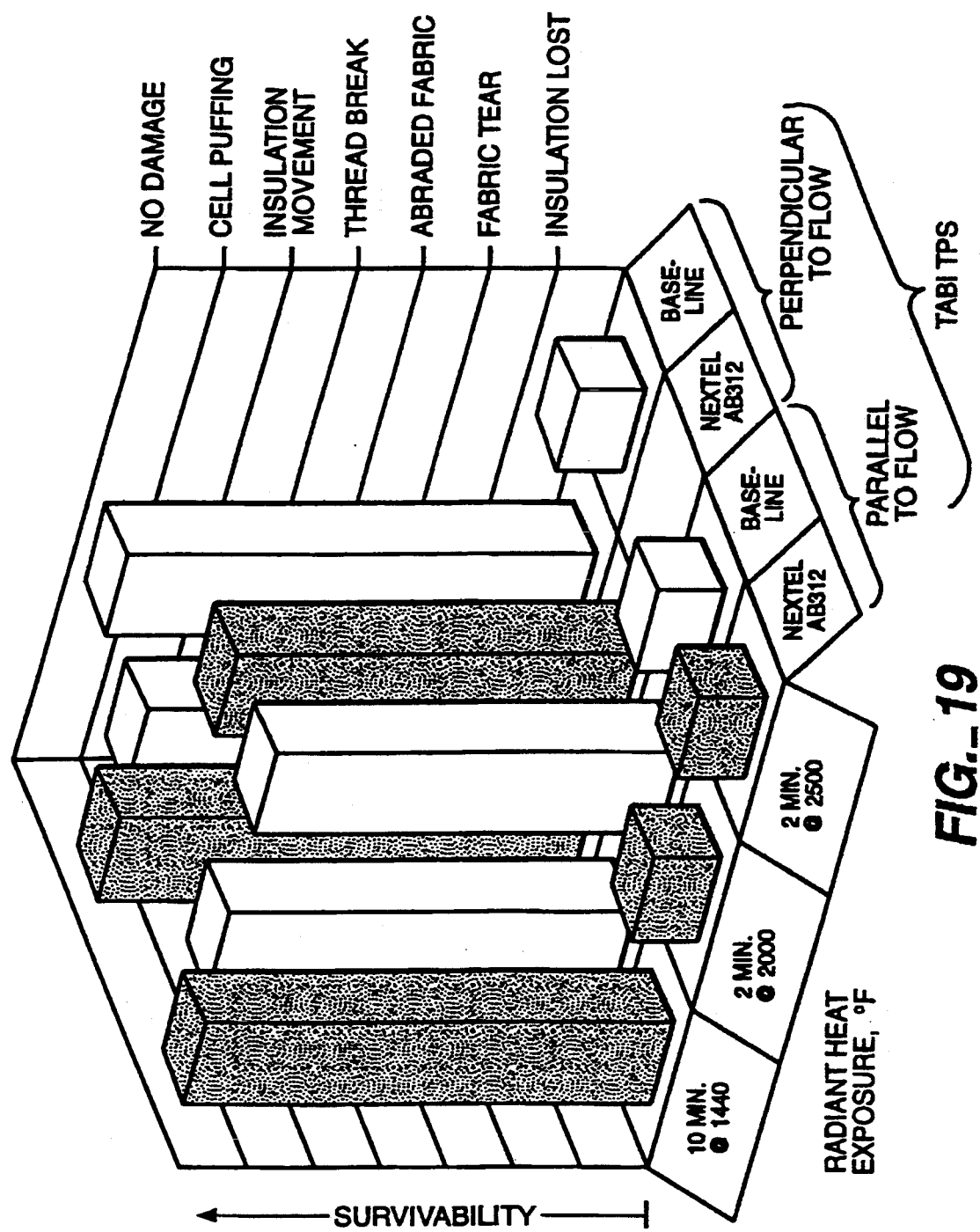
FIG._19

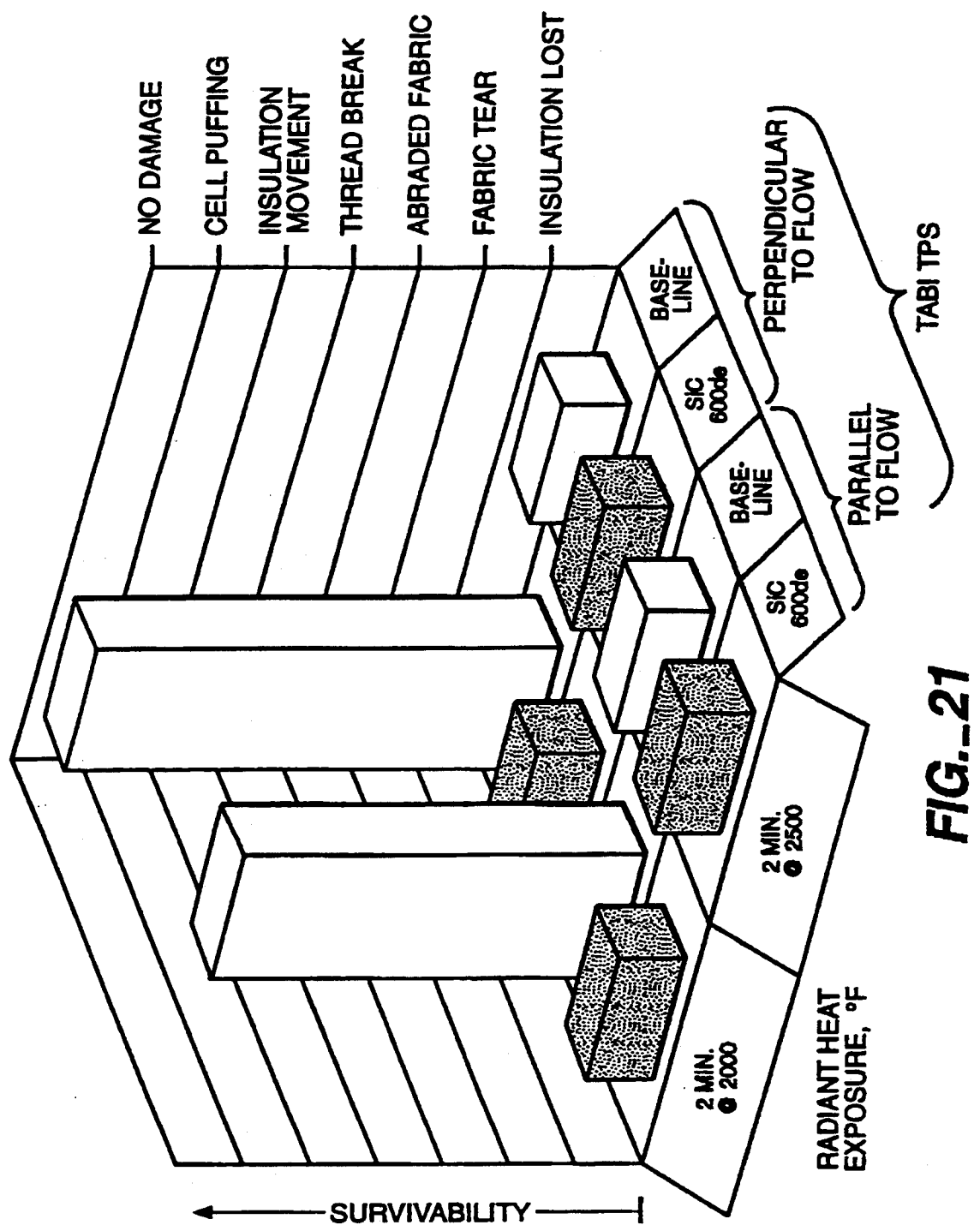

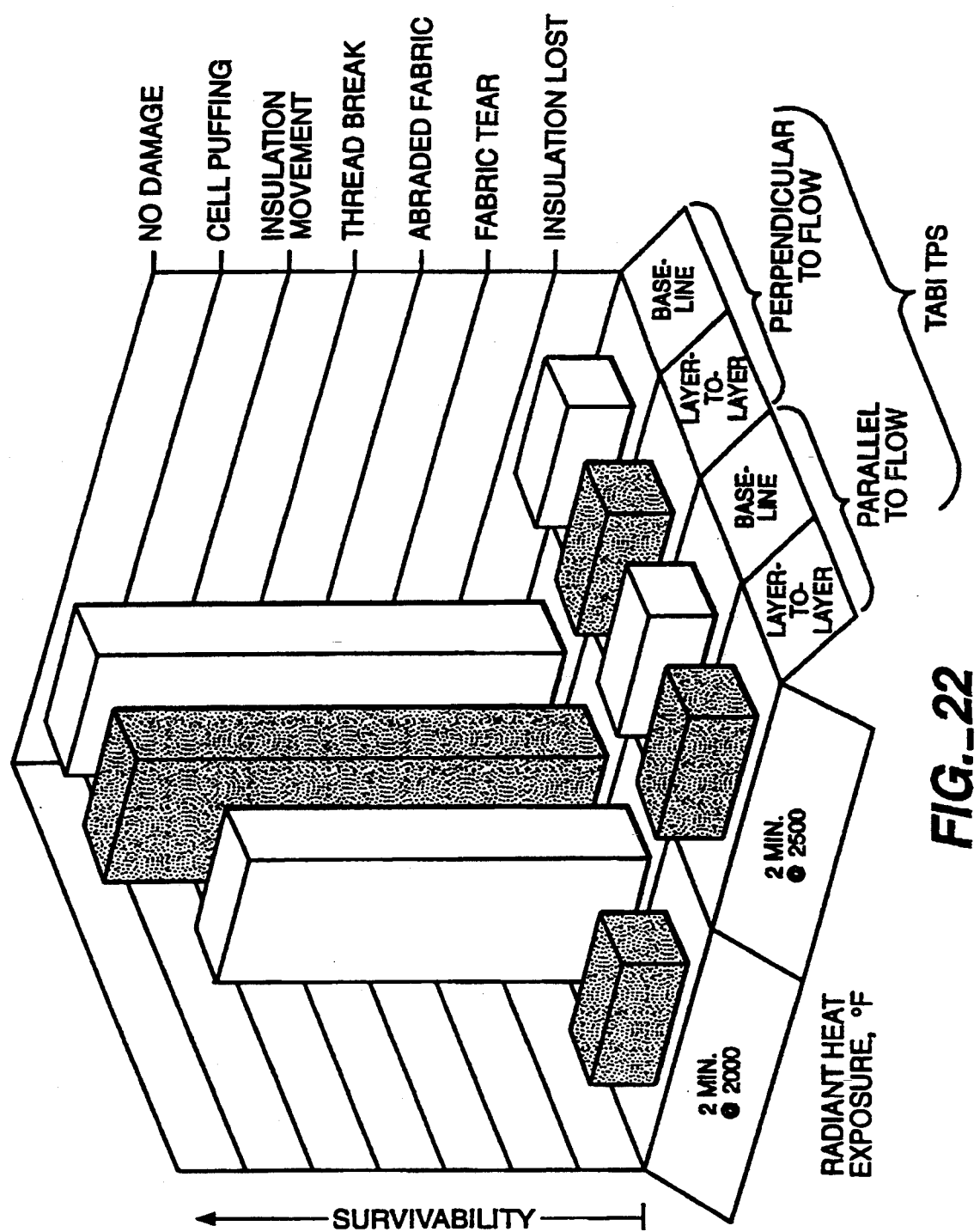
FIG._22

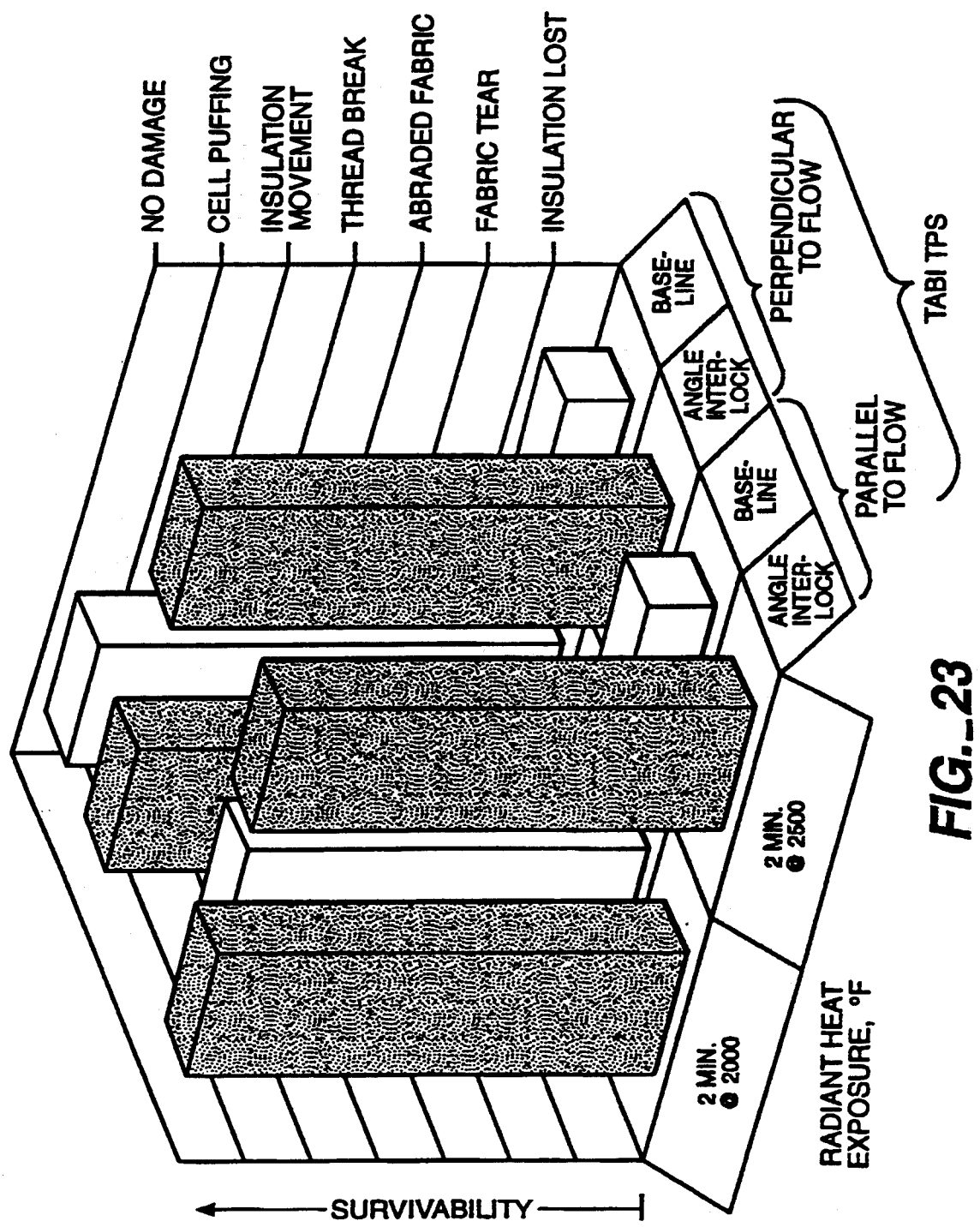
FIG._23

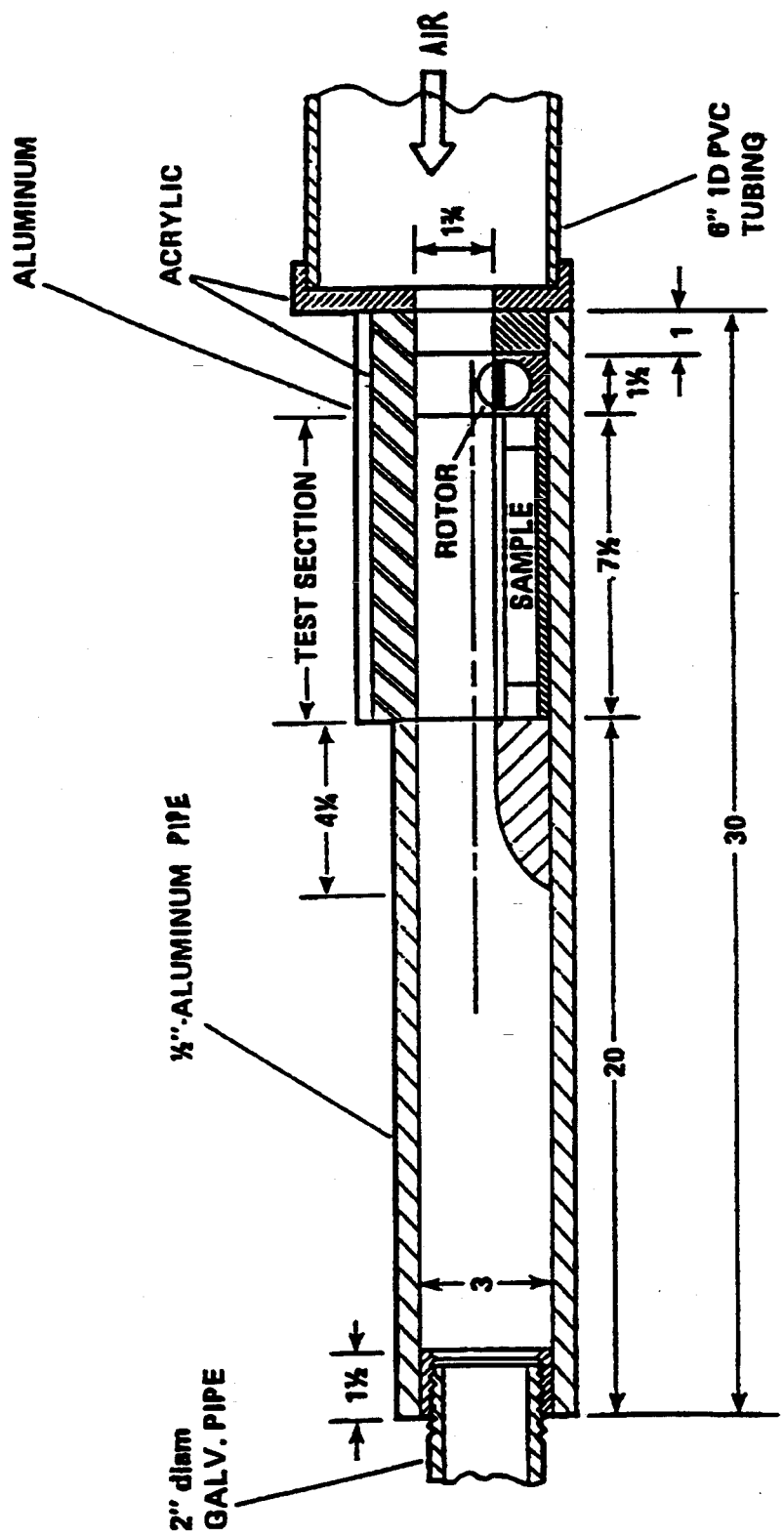
FIG._24

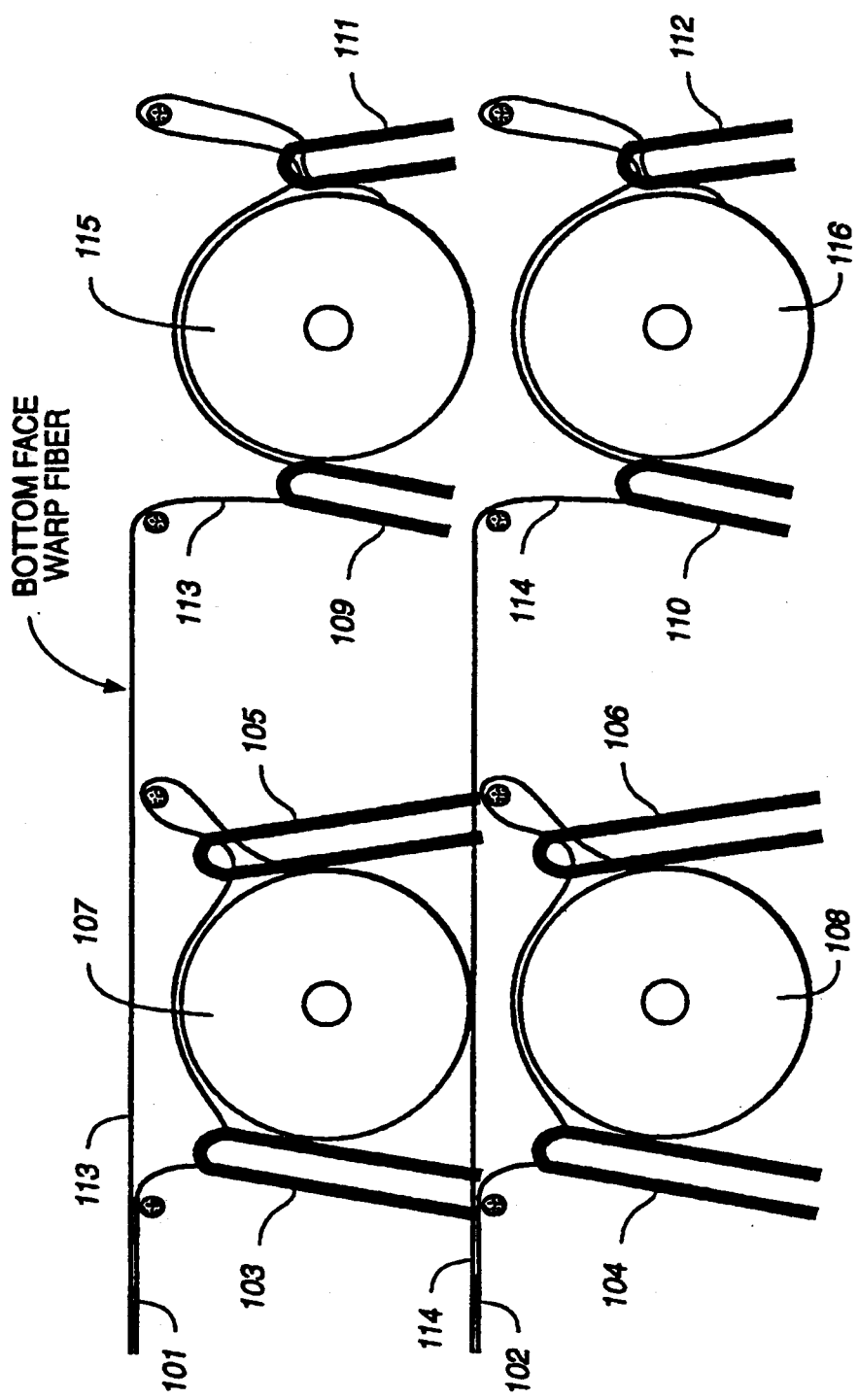
FIG._25

FLEXIBLE CERAMIC THERMAL PROTECTION SYSTEM RESISTANT TO HIGH AEROACOUSTIC NOISE COMPRISING A THREE-DIMENSIONAL WOVEN-FIBER STRUCTURE HAVING A MULTILAYER TOP FABRIC LAYER, A BOTTOM FABRIC LAYER AND AN INTERMEDIATE RIB FABRIC LAYER

BACKGROUND OF THE INVENTION

1. Origin of the Invention

The invention disclosed herein was made in the performance of work under a NASA contract and is subject to Public Law 96-517 (35 U.S.C. §200 et seq.). The contractor has elected to not retain title in this invention.

2. Field of the Invention

The present invention relates to a flexible ceramic thermal protection system (TPS) capable of surviving exposure to a high aeroacoustic noise level (170 decibel or greater) under fluctuating air loads, high temperature, and dynamic pressure conditions without the use or necessity of a surface coating to toughen the surface to the aeroacoustic load. The TPS is derived from an integrally woven ceramic core structure filled with a ceramic insulation possessing high temperature stability and low thermal conductivity insulation properties.

3. Description of Related Art

Conventional ceramic insulation blankets are usually assembled in a sandwich-like construction in which a layer of ceramic insulation is placed between a single-ply top or face fabric and a bottom single-ply fabric and held together with a ceramic sewing thread in a quilted stitch pattern. Sewn blankets can use other ceramic fabrics besides silica. Another blanket configuration utilizes an integrally woven single-ply core structure filled with insulation. This thermal blanket is reported in the literature as Tailorable Advanced Blanket Insulation (TABI).

Disadvantages of Prior Art—The stitched blanket (held together with a sewing thread) can fail during exposure to fluctuating pressures and high aeroacoustic loads, e.g. 170 decibels and a dynamic pressure of 510 pounds per square foot (psf). This failure occurs after exposure to a radiant heat source as low as 10 minutes (min) at 1200° F. In some cases, the thread or threads start breaking within one min and can propagate into fraying or tearing the surface fabric causing rapid destruction of the surface fabric followed by removal or loss of the insulation material. This loss renders the thermal insulation blanket useless for its intended purpose.

A single ply woven TABI, which utilizes an integral weave structure woven from 1800 denier silicon carbide yarn, when filled with silica batting will quickly show fabric fraying as well as movement of the insulation in the core or cell of the TABI structure. This occurs as low as 10 min at 1440° F. exposure to a radiant heat source and similar sound pressure levels and dynamic pressures as the sewn, quilted blankets.

This destructive result limits both these thermal blankets to low aeroacoustic and low temperature applications thereby minimizing the advantage of flexible ceramic blankets for applications, particularly in situations where acoustic resistance is required without resorting to or requiring a surface ceramic coating to toughen the surface fabric. These coatings can also degrade or interact with the ceramic fabric when cured at or exposed to high temperatures. The coating also adds weight.

Some art of interest is:

S. R. Riccitiello, et al. in U.S. Pat. No. 4,713,275 disclose a rigid ceramic reusable externally applied thermal protection system.

A. R. Campman, et al. in U.S. Pat. No. 4,922,969 disclose a multilayer woven fabric having varying material composition through its thickness.

D. A. Kourtides, et al. in U.S. Pat. No. 5,038,693 disclose composite flexible multilayer insulation systems consisting of alternating layers of metal foil and ceramic scrim cloth or vacuum metallized polymeric films quilted together using a ceramic thread.

H. Goldstein et al., "Improved Thermal Protection System for the Space Shuttle Orbiter." AIAA Paper 82-0630, May 1982.

B. Trujillo, et al., "In-Flight Load Testing of Advanced Shuttle Thermal Protection Systems." AIAA Paper 83-2704, Nov. 1983.

P. M. Sawko, et al., "Effect of Processing Treatments of Strength of Silica Thread for Quilted Ceramic Insulation on Space Shuttle." *SAMPE Ouarterly*, Vol. 6, No. 4, July 1985, pp. 17-12.

P. M. Sawko, et al., "Performance of Uncoated AFRSI Blankets during Multiple Space Shuttle Flights." NASA Technical Memorandum 103892, April, 1992.

D. Mui, et al., "Development of a Protective Ceramic Coating for Shuttle Orbiter Advanced Flexible Reusable Surface Insulation (AFRSI)." *Ceramic Eng. and Sci. Proc.*, Vol. 6, No. 7-8, Jul.-Aug. 1985, pp. 793-805.

P. M. Sawko, "Flexible Thermal Protection Materials." NASA CP-2315, 1983, pp. 179-183.

P. M. Sawko, "Tailored Advanced Blanket Insulation (TABI)." NASA CP-3001, 1987, pp. 135-152.

D. P. Calamito, "Tailorable Advanced Blanket Insulation Using Aluminoborosilicate and Alumina Batting," Final Report. NASA CR-177527, July 1989.

C. F. Coe, "An Assessment of Wind Tunnel Test Data on Flexible Thermal Protection Materials and Results of New Fatigue Tests of Threads," Final Report. NASA CR 177466, April 1985.

C. F. Coe, "An Investigation of the Causes of Failure of Flexible Thermal Protection Materials in an Aerodynamic Environment," Final Report, NASA CR-166624, March 1987.

H. K. Larson, et al., "Space Shuttle Orbiter Thermal Protection Material Development and Testing," *Proceedings of 4th Aerospace Testing Seminar*, 1978, pp. 189-193.

P. M. Sawko, et al., "Development of a Silicon Carbide Sewing Thread." *SAMPE Quarterly*, vol. 20, No. 4, July 1989, pp. 3-8.

P. M. Sawko, et al., "Strength and Flexibility Properties of Advanced Ceramic Fabrics." *SAMPE Quarterly*, Vol. 17, No. 1, Oct. 1985.

H. K. Tran, et al., "Thermal Degradation Study of Silicon Carbide Threads Developed for Advanced Thermal Protection Systems." NASA Technical Memorandum 103952, August 1992.

None of these references individually or collectively teach or suggest the present invention.

All articles, publications, books, journals, patents and patent applications and the like are incorporated by reference in their entirety.

What is needed is an integrated design and identification of materials which produce a flexible ceramic thermal protection system which has improved mechanical, thermal and sonic properties to high aeroacoustic noise (i.e. preferably about 2000° F., about 2300° or 2400° F. for 10 min, or 2500° F. for 5 min). The present invention accomplishes these objectives.

SUMMARY OF THE INVENTION

The present invention relates to an improved flexible three dimensional fabric structure comprising:

a multilayer fabric surface for the top face fabric;

a single layer fabric surface for the bottom face fabric surface;

a single layer rib fabric which forms an angled truss configuration connecting the top face surface and bottom face surface;

a high temperature stable ceramic insulation located between the top face and bottom face and adjacent to the surface of the rib truss fabric, wherein the top face fabric is woven in an angle interlock mode such that the outer top multilayer surface is an integral smooth tightly woven face sheet such that the rib fabric does not extend to the top surface, but remains below the exterior surface inter woven with in the fibers of the fabric, and the overall structure has enhanced resistance to aeroacoustic noise, preferably up to 170 decibels and enhanced resistance to heat, preferably up to 2500° F.

In another embodiment, the present invention relates to an improved composite multilayered flexible blanket insulation comprising a top fabric layer and a bottom fabric layer, high temperature insulation layer, and optional reflection shield layers and spaces, all secured using a ceramic thread wherein the top fabric and bottom fabric layers are secured to each other by the ceramic thread at an angle of from between about 45 and 135 degrees from the surface of either the top and bottom fabric layer creating triangular prism or trapezoidal prism shaped spaces between the top and bottom fabric and the insulation located therewithin has a correspondingly triangular prism or trapezoidal prism shape within the created spaces, wherein said blanket insulation is able to withstand an aeroacoustic environment up to about 170 decibels and temperatures up to about 2500° F.

In another embodiment, the present invention relates to a method to produce the improved flexible three dimensional fabric structure described above, which method comprises:

(a) combining during weaving a multilayer top face sheet, a single layer bottom face sheet, and a rib fabric each woven of the same or different high temperature ceramic fiber (or tow) by simultaneous weaving and interconnection by the rib fabric at locations on the top face sheet and bottom face sheet which are designated as nodes;

(b) warp fibers are woven in a plane at 90° angle to the direction of the formed flutes and are filled parallel to the flutes which flutes define multiple three-dimensional triangular prism or trapezoidal prism open volumes;

(c) filling the three-dimensional triangular prism or trapezoidal prism open volume with insulation comprising heat-resistant ceramic fibers; and (d) heat cleaning the formed structure at temperatures between about 800° and 2000° F., which expands the ceramic insulation of step (c) to fill the prism volume and (e) cooling the structure to ambient conditions.

In another aspect, the present invention relates to a method of producing a three dimensional angle interlock ceramic fabric which is stable to high aeroacoustic noise and to high temperatures up to 2500° F., which method comprises:

(a) obtaining multiple separate strands of a ceramic fiber or ceramic tow suitable for weaving;

(b) utilizing a modified fly - shuttle loom or a rapier shuttleless loom, which is modified by adding nip rolls to the loom and modification of the fabric advancement mechanism, which loom has at least eight harnesses in conjunction with Dobby programming mechanism;

(c) utilizing sufficient heddles for each warp fiber and a suitable reed which accommodates about 168 ends per in for a given fabric width wherein the top fabric has a shuttle, the rib fabric has a separate shuttle and the bottom fabric has a separate shuttle;

(d) drawing fabric warp sheets into the loom through a series of tensioning bars and into each respective harness for each fabric;

(e) utilizing an additional roller system to drive extra length rib fiber into the loom;

(f) translating the warp and fill yarn sequencing in a Dobby pattern chain utilizing bar and by indicator wherein each bar represents one fill fiber insertion and each peg indicates the lifting of a specific harness;

(g) weaving the fiber such that the Dobby mechanism reads one pattern bar instructing the loom to raise or lower one or more harnesses creating a shed opening;

(h) conveying a shuttle through the shed opening dispensing a fill yarn into its proper location;

(i) locking the fill yarn in place as the harness achieves its highest or lowest position which creates the next shed sequence, concurrently the reed pushes back the fill fiber into place and moves to its original back most position;

(j) utilizing the same shuttle to traverse the created fabric in the opposite direction dispensing another fill yarn in the newly formed shed opening;

(k) repeating steps (g), (h), (i) and (j) as needed to create the three dimensional angular open weave ceramic fabric structure described hereinabove.

BRIEF DESCRIPTION OF THE FIGURES

FIG. 1 is a cross-sectional schematic representation of the three dimensional fabric structure integrally woven fluted truss-core fabric with an angle interlock outer surface.

FIG. 2 is a cross-sectional schematic representation of an alternative structure having a layer-to-layer outer surface.

FIG. 3 is a cross sectional schematic representational of the three dimensional fabric structure having the flutes filled with expanded ceramic insulation.

FIG. 4 is a cross-sectional schematic representation of the three dimensional fluted core fabric components incorporating the angle interlock architecture.

FIG. 5 is a cross-sectional schematic representation of individual fabric fiber systems comprising 600-denier silicon carbide fiber.

FIG. 6 is a cross-sectional schematic representation of the woven fluted core structure with single-play fabrics.

FIG. 7 is a cross-sectional schematic representation of the multilayer face sheet having the angle interlock architecture.

FIG. 8 is a cross-sectional schematic representation of an alternative embodiment showing alternate multilayer face sheet layer-to-layer architecture.

FIG. 9A is a cross-sectional schematic representation of the invention of optimized locking arrangements of rib fabric to outer faces, i.e., rib lock to angle surface interlock.

FIG. 9B is a cross-sectional schematic representation of the invention of optimized locking arrangements of rib fabric to outer faces, i.e., rib lock to layer-to-layer surface.

FIG. 9C is a cross-sectional schematic representation of the invention of optimized locking arrangements of rib fabric to outer faces, i.e., optimized locking arrangements of rib fabric to the single ply face.

FIG. 10 is a cross-sectional schematic representation of the dimensional characteristics of fabric structure.

FIG. 11 is a cross-sectional schematic representation of the collapsed structure and defining the fiber arrangement of the article.

FIG. 12 is a cross-sectional schematic representation of a typical weaving loom arrangement.

FIG. 13 is a cross-sectional schematic representation of the loom creating the multilayer fabric.

FIG. 14A is a cross-sectional schematic representation of a single cut insulation prism (mandrel) before heating.

FIG. 14B upon heating shows the expansion of insulation of FIG. 14A.

FIG. 15 is a cut-away isometric view of the cold insulation insertion tool.

FIG. 16 is a cut-away isometric view of the rigid insulation mandrel having the insulation within the insertion tool.

FIG. 17A is a cross-sectional schematic representation of multiple prisms for the cold insulation article.

FIG. 17B shows the expanded insulation after heating the article of FIG. 17A.

FIG. 18 is a graphic comparison of silicon carbide TABI cell orientation to air flow at 170 decibels.

FIG. 19 is a graphic representation of aeroacoustic survivability of NEXTEL AB 312 TABI compared to baseline TABI at 170 decibels.

FIG. 20 is a graphic comparison of the aeroacoustic behavior of flexible ceramic TPS at 170 decibels in the NASA-Ames mini wind tunnel test facility.

FIG. 21 is a three-dimensional graphic comparison of aeroacoustic survivability of silicon carbide 600 denier single ply TABI compared to baseline TABI at 170 decibels.

FIG. 22 is a three-dimensional graphic comparison of aeroacoustic survivability of layer-to-layer TABI compared to base line TABI at 170 decibels.

FIG. 23 is a three-dimensional graphic representation of aeroacoustic survivability of angle interlock TABI compared to baseline TABI at 170 decibels.

FIG. 24 is a cross-sectional schematic representation of the mini-wind tunnel test facility (MWTF) used for aeroacoustic and heat measurements.

FIG. 25 is a cross sectional schematic representation of the weaving of the bottom face warp fabric.

DETAILED DESCRIPTION OF THE INVENTION AND PREFERRED EMBODIMENTS

Definitions:
As used herein:
"Ceramic" refers to the conventionally known and commercially available ceramic materials of the art which are fabricated in a fiber form. Preferably ceramic refers to silicon carbide, silica, TYRANNO ®, alumina, aluminoborosilicate, silicon nitride, silicon boride, silicon boronitride and the like.

"TYRANNO ® FIBER" is a registered trademark of the Ube Industric, Led of Tokyo, Japan. It is distributed in the U.S. by the Textron Corporation of Lowell, Mass. 01851. It is a continuous inorganic ceramic fiber made from organometallic polymers yielding on heating a ceramic fiber having a composition of silicon, titanium, carbon and oxygen. It has tensile strength of 400 KSI, a high modulus, and excellent high temperature properties at 2370° F.

One embodiment of the present invention utilizes a 600 denier silicon carbide yarn to weave a multi-layer top or face fabric while simultaneously weaving the rib and bottom fabric and integrally connecting these to the multi-layer woven top fabric. The difference here is that the top face fabric is woven into an angle interlock weave construction which toughens the surface to high aeroacoustic loads while the rib and bottom fabrics remain a single-ply fabric. The cores or cells formed are about one inch, triangular in shape and are stuffed and tightly filled with a low thermal conductivity insulative filler such as alumina batting, which has high temperature stability up to about 2800° F.

Referring now to the attached figures, FIG. 1 shows the angle interlock pattern of the present invention which provides a weave architecture which has a tougher, tighter fabric surface capable of resisting damage during exposure to high aeroacoustic loads and eliminating insulation movement of the insulation filling cores or cells, see FIG. 17B. This particular version has survived 15 min exposure to 170 decibels sound pressure level, after first being exposed to a radiant heat cycle for 2 min at 2500° F. The angle interlock fabric is woven to 0.032 in thickness in this case and the overall system density is 10 pounds per cubic foot (pcf). The results of aeroacoustic testing comparing the angle-interlock woven surface TPS to a single-ply TABI to the base line TABI are shown in FIG. 23.

An alternate version of the present invention is also fabricated using 600 denier silicon carbide yarn to weave the integrally connected structure, but replacing the angle interlock multilayer surface with a layer-to-layer surface weave. This configuration has shown no change to a 10 min exposure of 170 decibels after a radiant heat soak for 2 min at 2000° F. These results are shown in FIG. 22. The thermal insulation inserted in the cores was alumina. Another example of above TPS article uses a low boria content (2%) aluminoborosilicate (ABS) batting as the insulative filler.

The angle interlock version is also filled with the ABS batting to provide comparable thermal conductivity and density.

Other ceramic yarns are also employed in place of the silicon carbide yarn depending on the temperature performance requirements. These include, for example, aluminoborosilicate, silica, TYRANNO ®, silicon nitride and the like, as additional examples of other high temperature yarns for weaving into these complex, integrally connected woven TPS structures.

Advantages of Invention over Prior Art

Some advantages over prior art include:

a. providing a ceramic blanket that can survive exposure to high aeroacoustic noise levels (170 decibels) after exposure to 2500° F. radiant heat.

b. providing a TPS that eliminates the need of a ceramic surface coating to improve the aeroacoustic performance of flexible ceramic TPS blankets after exposure to high temperatures.

c. providing a low density TPS for a savings in weight.

d. providing a flat, smooth surface for aerodynamic smoothness as compared to bumpy, quilted surface of sewn blankets.

e. providing a multi-layer surface for integrally woven TPS articles without resorting to layering or stacking individual fabric layers.

f. permitting the use of high temperature ceramic yarns such as silicon carbide to be used in a threadless fabrication method.

The following features of this invention are novel:

a. using the TPS article to provide resistance to high aeroacoustic loads after exposure to a radiant heat environment.

b. using a multi-layer weave construction such as angle interlock and layer-to-layer as a fabric surface capable of resisting high aeroacoustic noise levels.

c. using the integration of multi-layer weave architecture as a face fabric of an integrally woven core structure.

d. using the threadless (no sewing thread to assemble) method to fabricate high temperature high aeroacoustic noise capability TPS articles.

Now referring to the figures, the present invention relies heavily upon the art of weaving, specifically the weaving of integrally woven fluted core structures. The invention's three-dimensional fabric structure 10 is illustrated in FIG. 1. It is significant in that the opposite parallel face sheets (top face sheet 11 and bottom face sheet 12) and rib fabric 13 which forms the three dimensional truss configuration 11 are all integrally connected. The woven preform utilizes a multilayer fiber architecture in top face sheet 11 with single ply constructions in the bottom sheet 12 and rib fabric 13. The multilayered face 11A consists of an angle interlock architecture 14 (at the top) and 15 (at the bottom). In one embodiment, the invention's structure is woven entirely with 600-denier silicon carbide fiber. The fine filament diameter of this ceramic yarn allows for a high fiber density in the woven preform. Woven into an angle interlock construction 14, the outer multilayer surface face 11A results in a smooth and tightly woven face sheet, which is an essential characteristic to the invention's aeroacoustic performance. This style of multilayer construction 11 also enhances the integrity of the top surface 11A by preventing fiber movement during service loads and temperatures.

As seen in FIG. 2, an alternate multilayered top surface 11A consisting of a layer-to-layer 11 and 11B construction may also be incorporated into the invention's top face 11A.

Secondary processing is required to fully establish the thermal protecting nature of the invention. As seen in FIG. 3 this includes filling the triangular shaped flutes 16 of the as-woven structure with a ceramic insulation 17 followed by a heat cleaning operation to remove all organic binders or finishes. In this heat cleaned, insulated condition, the present invention 10A exhibits its flexible ceramic high temperature characteristics. The fluted core structure of FIG. 1 is unique in that the integrally woven rib fabric structure 13 ensures total encapsulation of the insulation 17.

The fluted core fabric structure of the present invention, as shown expanded in FIG. 4 consists of three individual fabrics, two outer parallel face sheets 11 and 12 and one rib fabric 13. In one embodiment, each fabric is woven from silicon carbide fiber having 600-denier. These three fabrics are woven simultaneously and interconnected by the rib fabric 13 at locations designated as locks or nodes 14 and 15. Warp fibers are woven normal to the direction of the flutes, and fill parallel to the unfilled flutes 16.

In other embodiments the top surface fabric 11, bottom surface fabric 12 and rib fabric 13 are each independently selected from the same or a different ceramic fiber. For example, top surface fabric is a high temperature fiber, such as TYRANNO ®. This outer surface 11A is in contact with the environment and therefore must withstand the highest temperatures and most severe acoustic (and mechanical) stress. The bottom fabric 12 and rib fabric 13 are selected from ceramic fibers which are less expensive, easier to fabricate, have a lower melting point, etc. (than the top fabric 11), because they are not subjected to the high temperatures and mechanical or aeroacoustic pressures. For example, a TYRANNO ® fiber (defined above) or silica is used for the top face surface, and lower temperature fiber silicon carbide is used for the rib and bottom fabric. The invention's fluted core structure includes design parameters, such as yarn system, fabrics' weave style, fabric ply thicknesses, and flute height.

Each of the three fabrics contains its own warp and fill fiber system (see FIG. 5), with the exception of the nodes. There, several fill fibers are shared by the rib and opposite faces to create the locks. Each fabric comprising the structure requires its own design, and the overall structure design must be coordinated so that the warp yarns of the rib fabric 13 interlock properly at the nodes 14 and 15 formed with the face fabrics 11 and 12.

In ordinary woven fluted core structures 10, the individual fabrics usually are single ply with a plain weave construction, see FIG. 6. However, the present invention incorporates a multilayered fiber architecture in the outer face, containing four warp layers 20, 21 22 and 23 and three fill layers 24, 25 and 26, see FIG. 7. Referred to as angle interlock (e.g. 11) or through the thickness weaving, it is formed when continuous warp fibers weave uninterruptedly along an angled path, through all three fill layers comprising the fabric's thickness to the inner surface, and return to the outer face to complete one weave cycle or repeat.

As an alternate surface construction, FIG. 8 demonstrates that the invention may instead use a layer-to-layer architecture rather than the angle interlock. In this weave, the warp fibers (33–40) weave normal (90°) to the three fill layers 41, 42, 43, but do not pass through the entire thickness.

In FIG. 9C, the opposite (or bottom) face and rib fabric 13 are both single ply, plain weave construction. The locking arrangements 14 and 15 of the rib fabric 13 to the multilayered and single ply faces 12 are optimized to offer the greatest mechanical integrity.

FIGS. 10 and 11, show in a preferred embodiment, a pair of rib warp fibers making up the rib fabric are programmed to intersect the underside of the multilayer fabric and weave through two fill layer thicknesses. The rib fibers 30 and 31 pass over three fill fibers of the mid fill layer and four of the bottom layer, and then exit the multilayer fabric after which, they resume interlacing with fill fibers to form the rib fabric 13. The connection of rib fabric 13 to outer face 11A also forms the triangular shaped unfilled flutes 16 of approximately equally dimensioned legs, with angles between legs of about 60°, and the inner flute height of the structure measuring about 1.0 in. The additional fabric thicknesses of the multilayered top fabric 11 (0.030 in) and single-ply lower fabric 12 (0.009 in) results in an overall panel thickness of 1.03 in. The present invention utilizes 600 denier silicon carbide fiber throughout the preform structure. Based upon the fiber's cross-sectional area and desired characteristics of the woven structure, warp and fill counts are established for the multilayered surface, single ply face and rib.

FIG. 11 is a schematic representation of the collapsed structure 10A of the unfilled TABI woven article. FIG. 1 shows the stretched unfilled TABI structure 10.

Table 1 below summarizes the fiber counts for one embodiment of the present invention's woven structure.

TABLE 1

| | FLUTED CORE FIBER COUNTS | | | |
|---|---|---|---|---|
| Multilayer Architecture | Fiber System | Top Face | Rib Fabric | Bottom Face |
| Angel | Warp (yarn/in) | 112.0 | 28.0 | 28.0 |
| Interlock | Fill (yarn/in) | 84.0 | 26.S | 30.0 |

Given the attainable fiber counts and desired flute dimensions, the number of fill yarns contained within each section of the preform may be calculated. For example, based on a fill fiber count of 26.5 yarn/in for the rib fabric, 1.0-in flute height, and about a 60° between rib and outer face, a total of 30-fill fibers are required in the rib fabric between nodes. Following similar calculations for other fabric sections, a design schematic of the invention's structure may be developed, see FIGS. 1-11. Every warp and fill yarn is arranged to produce the desired construction and flute dimension. The structure is then illustrated in a collapsed form, see FIG. 11, from which each warp fiber system (see FIGS. 1-8) can be identified, as well as each fill yarn system making up one design repeat of the structure. The fiber arrangement defines the sequence in which warp yarns are programmed to weave around inserted fill yarns. The numbered warp fibers correspond to the loom harness that controls the raising or lowering of that warp fiber group at a specific fill (pick) number. This information is basic and sufficient to enable one of skill in this art in developing the loom programming.

Programming, Loom Preparation and Weaving:

The present invention's structure is woven on a modified Cotton-King fly-shuttle loom from Crompton & Knowles, adapted with a Dobby programming mechanism from Draper or Staubli. The loom contains eight harnesses, one controlling each warp sheet, with sufficient heddles for each warp fiber, and a suitable reed that will accommodate 168 ends/in for a given fabric width. A typical loom set-up to weave the fluted core structure is shown schematically in FIG. 12. Each of the fabric warp sheets is drawn into the loom through a series of tensioning bars and then into their appropriate harness. Since rib warp yarns weave a longer path than those from the parallel faces in a given unit length, an additional roller system (nip rolls) must be incorporated to drive extra length rib fiber into the loom. The warp and fill yarn sequencing, FIG. 11, is translated into a Dobby pattern chain made up of bars and peg indicators; each bar representing one fill insertion and each peg indicating the lifting of a particular harness. This programming provides the proper sequencing of shed openings for each fill yarn insertion. During weaving, the Dobby mechanism reads one pattern bar instructing the loom to raise or lower one or more harnesses (warp sheets). This forms a shed opening through which a shuttle is then powered, dispensing a fill yarn as it traverses the width of fabric. On the subsequent pattern bar, a different set of harnesses will be raised or lowered. Simultaneously, the graduated reed 40 moves forward and beats (packs) the just-inserted fill yarn into its proper location, and is immediately locked into place as the harnesses reach their highest or lowest movement. FIG. 13 illustrates a fill insertion in the multilayered face sheet. Here seven warp sheets 21, 22, 23, 31, 30, 27, 28, are shown lowered by their harness—while one warp 20 remains raised. A shuttle dispenses a fill yarn 50 into the shed opening 51. As harnesses - are raised and lowered for the next shed sequence, reed 40 beats the fill fiber into place and rocks to its back most position. The same shuttle traverses across the fabric in the opposite direction dispensing another fill yarn in the newly formed shed. Each of the three fabrics in the invention's structure requires its own shuttle.

With each fill yarn insertion there follows an advancement of the as-woven fabric by the loom's gear driven cloth roll. A combination of gears and ratchets determines the proper fill density in each of the fabrics comprising the fluted core structure. A pawl/ratchet system also advances the required length of rib warp fiber through the nip rollers.

The flexible three dimensional ceramic fabric structure is also produced using the description provided herein under contract by BP Chemicals (Hitco), Inc., Advanced Materials Division Fibers and Materials, 1600 West 135th Street, Gardena, Calif. 90249. Other commercial companies which can produce the ceramic woven article (with this specification) include, for example, Mutual Industries, Philadelphia, PA, Textile Technologies, Inc., (TTI), Philadelphia, Pa., or Textile Products, Inc., Anaheim, Calif.

Insulation Processing:

Subsequent to weaving of the invention's structure, the fluted cells 16 are filled with a rigidized ceramic insulation 17A, see FIG. 14. The entire structure is heat cleaned to remove all organic binders, during which time the insulation expands to fill the flutes tightly and completely 17. In this insulated, heat-cleaned state, the invention acquires its flexible thermal protection characteristics with optimized resistance to high aeroacoustic noise.

The ceramic insulation 17 usually consists of high purity alumina fibers (95% $Al_2O_3$, 5% $SiO_2$) that are combined in a mat form to yield a 6-lb/cu ft density at a 1.0-in nominal thickness after heat cleaning. The insulation sheets are usually supplied as prerigidized boards using an organic binder, and having a measured thickness less than the inner flute height dimension. In rigid form, the insulation panels are cut into mandrels approximating the flute shape and dimension, and then easily inserted into the hollow cores. The rigid insulation boards are of any length suitable for handling and formation, but the width must equal the flute length.

An ordinary table saw capable of adjustable angled cuts is used to produce the triangular shaped ceramic insulation mandrels. Since the insulation mandrels will expand only in its thickness direction (or flute direction), mandrels must be cut to the dimensions of the flute's top and bottom bases, see FIG. 14. The angled cut depends upon the actual supplied insulation board thickness. When cut properly, the insulation expands to the shape of the flute cross section and maintain its 6-pcf density.

The process to fill the fabric flutes with the rigid insulation mandrels is facilitated by an insertion tool 62. The tool consists of a 0.004 in polyester film 61 formed to the triangular flute shape and attached to the end of an inspection mandrel 62. See FIG. 15. The inspection mandrels 60 constructed to the exact shape and dimensions of the fabric's cells, are used to verify the flute size.

The insulation mandrels are enveloped in the polyester shroud 61, FIG. 16, and the tool 60 is pulled through the flute 16. The polyester film 61 eliminates the abrasion and friction between the woven fabric and insulation mandrel 17A that results if it is not otherwise used. When the insulation 17A mandrel occupies the entire flute length, the insulation is held in place and the insertion tool 60 is extracted.

In FIG. 17, adjacent flutes 16 are similarly filled with insulation mandrels 17A to form a length of an insulated panel structure 65. Broken or discontinuous insulation mandrels which may create undesirable heat paths are removed from the flutes and replaced with a whole mandrel. Once a panel structure has been insulated with rigidized ceramic mandrels, the structure 65 is subjected to a heat-cleaning operation in a gas-fire, air circulating oven. The heat-clean cycle is defined as about 4 hr at 850° F. Any organic binders such as yarn finishes, or rigidizing binders contained in the insulation are entirely removed. The ceramic insulation exhibits its resilient nature and expands fully inside the fabric flutes attaining the 6-PCF density.

The structure of the present invention can be of any size or volume. However, when used in aerospace applications, size and pounds per cubic foot considerations are important. Therefore, the structure can be of any useful length and width. The thickness, when the volume between the top face sheet and bottom face sheet is filled with ceramic insulation, is between about 0.5 and 6 in, preferably between about 0.5 and 3 in, and especially preferred is about 1 in.

FIG. 18 is a two dimensional graphic representation comparing a silicon carbide TABI cell based on the orientation to air flow at 170 dB. As can be seen a test at 2000° F. for two min shows that the baseline 1800 de single ply, angle interlock and layer-to-layer construction exhibit comparatively minor damage. On the other hand, the test at 2500° F. for two min shows that the angle interlock structure of the present invention is clearly superior and suffers little damage.

FIG. 19 is an isometric graphic representation of the aeroacoustic survivability of NEXTEL AB312 TABI compared to baseline TABI at 170 dB. As can be seen the tests at 1440° F. for 10 min and at 2000° F. for two min have roughly comparable minor damage. However, at 2500° F. for two min, severe damage occurs to the structure causing loss of insulation value.

FIG. 20 is a graphic comparison of the aeroacoustic behavior in a mini wind tunnel test (see FIG. 24) of flexible ceramic TPS at 170 dB at various temperatures. As is seen, at 2500° F. there is significant damage to the uncoated AFRSI and the C-9 coated AFRSI.

FIG. 21 is a graphic representation of the survivability of SiC 600 de TABI as compared to baseline TABI at 170 dB. As can be seen, at 2000° F. for 2-min, the baseline TABI survives with little or no damage. The SiC 600 de for parallel and perpendicular flow degrades and the insulation value is lost. At 2500° F. for two minutes, the structure of all samples degrade to a point that the insulation is lost.

FIG. 22 is a graphic representation of aeroacoustic survivability of layer-to-layer TABI as compared to baseline TABI at 170 dB. As can be seen at 2000° F. for two min, only minor or no damage occurs. However, at 2500° F. for two min, in all samples severe degradation occurs and insulation is lost.

FIG. 23 is a graphic representation of the aerocoustic survivability of angle interlock TABI of the present invention as compared to baseline TABI at 170 dB. As is seen in the tests at 2000° F. for 2 min, there is little or slight degradation to any of the samples. However, when the samples are heated at 2500° F. for two min, the angle interlock TABI of the present invention survives with little or no degradation. The baseline TABI under these conditions in severely degraded and the insulation value is lost.

The following Examples are presented for the purpose of explaining and describing the present invention. They are not to be construed to be limiting in any way.

EXAMPLE 1

Weaving of the Angle Interlock Framework

The fiber counts of the angle interlock face sheet (112 EPI×29 PPI) and the single ply bottom face (28 EPI×33 PPI) were established. The rayon served 600-denier SiC warp was entered into the loom. These fibers comprised the TABI sheets and the rib structure.

The node locks connect the rib fabric to the top and bottom faces. Several alternative node designs for both faces had been developed. Style B (FIG. 9A) and Type A (FIG. 9C) designs were selected as locks for the top and bottom faces respectively. In the Style B lock, the rib fabric is connected to the angle interlock face as the rib warp passes over two of the three fill layers in the angle interlock fabric. This design was chosen over Style A since it locked to one additional layer, offering greater locking strength. Originally Style C appeared to be a tighter lock with the interweaving of the rib warp to a single fill yarn in the second layer of the angle interlock face. There was a question as to whether this tightness would result in weaving difficulties. The interweaving of the rib warp might restrict the close packing of the fill fibers and create a gap in the node center of the outer layer. Also, there was a possibility of the rib fibers shearing due to the fiber density and severe crimping during beat-up. Therefore, Style B (FIG. 9A) was chosen.

In earlier SiC TABI structures, (see FIG. 9) the Type A node design was successfully used to lock the rib fabric to the single layer face sheets. The Style A node permits a more secure lock with greater integrity over Styles B and C. This is true using the finer 600-denier SiC fiber. Node design Style A was selected as a preferred embodiment.

The correct flute size could be established by adjusting the lengths of the rib and face fabrics. The node locks selected were incorporated into the TABI fabric design and included in the loom programming. Several locks of both Style B and Style A were successfully woven at the established fiber counts without difficulties. Samples of each were cut from the loom, heat-cleaned and examined for fiber breakage and lock integrity. The SiC fibers in each lock survived the weaving without damage and the locks appeared tightly woven exhibiting toughness and strength.

Some warp fiber floats occurred in the bottom face during weaving, see FIG. 25. Random SiC fibers 101 and 102 from the bottom face were malfunctioning (hanging-up) as a result of tensioning weights 103, 104, 105 and 106 not acting properly on the fiber about rollers 107 and 108. The tensioning weights were too long and would ride on fibers below them. Without the taughtness in the fiber, floats occur. Shorter tensioning weights 109, 110, 111 and 112 were substituted which acted more positively, taking up any fiber slack produced during the weaving operation and about rollers 115 and 116. This change eliminated any further floats in the bottom face.

The target TABI dimensions for this debugging task are defined in FIG. 10. The TABI fabric incorporating an angle interlock face sheet was examined. This operation included adjusting the flute dimension and geometry, correcting any defects in the loom programming, weaving trial samples, and fine tuning the loom functions.

The initial fabric woven to evaluate the node locks was also used for the first check of the TABI flute cell size. A section of this fabric was cut from the loom, heat-cleaned, and inspected for cell dimension and defects. Upon inspection, the heat-cleaned sample first revealed a repetitive weave defect (appearing as a line) across the angle interlock face sheet. Also noticeable were randomly broken warp fibers in the bottom face. This breakage was attributed to the fiber beat-up required to obtain the high fill count (total) in the entire TABI structure. When weaving the individual fabric samples for the opposite faces, the rib fibers were programmed to float between the two, so the bottom face sheet did not experience this severe beat-up and was woven without breakage. With the addition of the rib fabric and locking nodes, the fill density increased amply to cause higher beat-up resulting in the breakage of warp fibers in the bottom face fabric. It was necessary to reduce the fill count to 30 PPI in the bottom face to avoid further breakage.

The rib fabric was measured at approximately 1.31 in creating an oversized cell. To adjust the cell size it was required to build an entirely new program chain. The revised programming involved the removal of several picks from the rib fabric which would effectively weave a shorter rib. The fill count in the bottom face was also adjusted by this program change.

A 600-denier SiC fiber was woven into an integrally woven fluted core with an angle interlock face sheet.

After installing the new weave program on the loom, a second TABI start-up sample was produced, approximately two feet long. A section was cut from the loom, and again heat-cleaned and inspected. Similar to the first sample, a defect line occurred across the width of the angle interlock face sheet. While examining the program, it was discovered that a small peg, which indicates the lifting of a harness was improperly placed. The bottom face sheet did not experience any further breakage after the reduction in its fill count. A portion of the heat-cleaned sample was sliced open to attain a measurement for the rib fabric length, and to examine the inside walls of the flute and inner lock formation. The rib fabric measured 1.20 in exceeding the target value of 1.14 in. It was again necessary to reduce the rib length by removing picks from the connecting web. The rib fabric appeared intact, as well as the top and bottom locks.

The flute geometry of this sample and an accurate measurement of the overall panel thickness were observed by filling a small section with Saffil insulation and heat-cleaning at 850° F. Rigid Saffil insulation mandrels were cut to the dimensions shown in using an ordinary table saw, and inserted into the fabric flutes (see FIGS. 14A, 14B, 15 and 16). These dimensions consider the spring-back nature of the insulation after binder removal, and that the Saffil must fill the entire cell and maintain 6 PCF density at the designed cell height. The overall panel thickness of the heat-cleaned TABI sample was then measured under 3.4 psi, at 1.08 in (from top node to bottom face fabric), surpassing the target of 1.03 in. The triangular flute configurations were distorted by a length of the excess rib fabric. Saffil insulation filled the flutes tightly, actually forcing the single ply bottom face to bulge slightly from a flat configuration between the locking nodes.

The TABI fabric design required a final modification to adjust the rib fabric length and obtain the desired panel thickness. The reduction in rib length was completed first by removing a pair of picks from the rib, and secondly, by adjusting the drive let-off for the rib warp. This rib drive system consists of a pair of drive rollers controlled by a ratchet gear which allows for slight adjustments to the rib length. The rib warp fibers pass through these drive rollers into the loom, and ratchet gears are selected for the desired amount of rib advancement.

About three feet of SiC TABI fabric was woven using the modified programming and the rib drive gear adjustments. A section of fabric was cut from the loom for inspection of the rib length, cell dimension, flute geometry, and any weaving defects which may have occurred. A heat-cleaned sample of this fabric revealed a rib fabric length of 1.14 in, indicating adjustments were properly made. Inner surface locks appeared undamaged by the weaving and in good condition. The remaining as-woven section was insulated with Saffil mandrels and heat-cleaned accordingly. The overall panel thickness of the TABI sample measured 1.02 in, and it exhibited a uniform cross section of tightly filled flutes, with straight ribs. As in previous samples, the bottom face protruded between the locking nodes due to the resiliency of the Saffil insulation. The angle interlock top face appeared flat with a uniform weave pattern. The sample was free of weaving defects and anomalies.

The final dimensions and schematic of the 600-denier SiC triangular fluted core TABI fabric incorporating an angle interlock face sheet are shown in FIG. 11.

An initial four foot TABI panel was produced. Few difficulties were encountered during the weaving operation of this panel, except for occasional breakage of the SiC warp fibers. Once woven, the TABI fabric panel was cut from the loom, visually examined for weaving defects, and flute size inspected with check mandrels. Prior to heat cleaning, defects can be masked by the rayon serving; however, careful inspection of the panel did not reveal any major flaws. Inspection mandrels were used to check each individual cell in the panel. The TABI panel contained uniform and properly sized flutes with the exception of two undersized cells. After inspection of the flutes, Saffil insulation mandrels were cut as described above and inserted into the TABI fabric. The undersized flutes were custom fit with smaller Saffil mandrels. The insulation process makes use of a specially fabricated insertion tool consisting of a 0.004-in (MYLAR ®) sheet attached around the perimeter of an undersized triangular check mandrel. A Saffil mandrel is placed inside the MYLAR envelope holding it firmly with a small gap between the check mandrel end. The check mandrel is then inserted into the fabric and pulled through the entire cell length until the insulation mandrel was completely inside the flute. Placing a straight edge in the separation between the mandrel and insulation would allow the insertion tool to be withdrawn from the fabric, while the Saffil insulation remained in the cell. This insertion tool facilitated the insulation process and also minimized the breakage of insulation mandrels.

The insulated TABI panel was then heat-cleaned in a gas fired oven for four hours at 850° F. to remove all organic binders, sizing, and rayon serving. Upon examination of the heat-cleaned panel, angle interlock top face sheet protruded between the locking nodes (bump-like appearance). The protrusions only occurred over a 18–20 in area in the center of the panel. They were not evident at the ends of the panel where the panel appeared flat. It was not known what caused the bumpiness or whether this effect might reappear on subsequent panels. It should also be noted that this characteristic was not noticeable prior to heat cleaning nor obvious in preceding start-up samples. Although the top face distorted at the panel's center, the flute geometry maintained its uniformity, and the Saffil insulation filled the flutes tightly.

Test specimens cut from the panel were used to determine the panel thickness, fabric areal weight, TABI areal weight, and TABI density. The actual TABI characteristics and estimated values are compared in Table A. The panel thickness measured 1.02 in. The actual areal weight of heat cleaned TABI fabric (without insulation) weighed 29.65 oz/sq yd, within 4% of the estimated weight based on target fiber counts. The TABI density measured 9.93 lb/cu ft, higher that the calculated density of 8.21 lb/cu ft which is based on 6.0 lb/cu ft insulation density at 1.0 in. The difference in these values can be attributed to the actual nominal density of the Saffil insulation of 7.5 lb/cu ft.

TABLE A

| | TABI Characteristics | | | |
|---|---|---|---|---|
| | TABI Fabric Areal Weight, H/C (oz/yd$^2$) | TABI Panel Areal Weight, H/C (oz/yd$^2$) | TABI Density (lb/ft$^3$) | TABI Panel Thickness (in) |
| Estimated | 22.48 | 100.48 | 8.21 | 1.03 |
| Actual | 29.65 | 121.60 | 9.93 | 1.02 |

Weaving continues after removing the first panel from the loom. The distance the fabric must travel through the loom drive and idler rollers before reaching the take-up roll, where fabric is removed, is nearly 3.5 ft. In order to cut a 4.0 ft panel from the loom a total of 7.5 ft must be woven. At the time of doffing panel 1, the second TABI panel was complete and the third partially woven. Without evidence of defects or protrusion-effect on the as-woven panel 1, it was decided to complete panel 3, begin panel 4, and then doff both panels 2 and 3 together. It was not until midway through the completion of panel 4 that the surface effect was discovered on the first panel. Any changes of modifications to the weaving at this point might jeopardize the physical characteristics of the fourth panel. Also, the protrusions in the first panel might have been inherent to that panel only and so the weaving of panel 4 continued. When removing panels 2 and 3 from the loom, panel 3 was mistakenly cut short by 0.5 ft. This difference was made up by increasing the length of panel 5 accordingly.

TABI panels 2 and 3 contained only two and three undersized cells respectively, each being fit with custom sized Saffil mandrels. All other flutes were filled with properly cut Saffil insulation mandrels according to the insertion process described above. Both panels were heat-cleaned simultaneously and then inspected for major defects. The protrusions encountered in panel 1 reappeared in both 2 and 3 panels but to a lesser degree. Few random fiber floats occurred in the bottom face of both panels, due primarily to broken rayon serving being entangled with adjacent fibers. Cross-sections of the insulation filled flutes appeared uniform.

After discovering the protruding effect of the angle interlock top face in panels 2 and 3, production of TABI fabric was interrupted to determine a course of corrective action. However, at this time the weaving of panel 4 was complete, and weaving had commenced on panel 5.

During the completion of panel 6, panel 4 was cut from the loom. The panel was processed similarly to the proceeding three panels: flute inspection, insulating, heat-cleaning, and final inspecting. The TABI fabric flute dimensions were correct and uniform throughout the panel. The cells were insulated with pre-cut Saffil mandrels and the panel heat-cleaned. The flutes were filled tightly with the Saffil insulation displaying a consistent flute geometry. The panel exhibited bumps again on the angle interlock top face, only in the center portion of the panel while the adjacent edges appeared flat.

The angle interlock face sheet weaves above the rib fabric and bottom face, and forms the outer fabric as it passes over the front idler roll, FIG. 13. At this roll, it has not yet reached a completely collapsed state and has an appreciable thickness, unlike the condition at the pin-roll where the fabric is much flatter. Combining the thickness of each fabric indicates that the outer angle interlock layers are further from the center of the idler roll ($R_{ir} + t_i + t_r + t_b$) than the rib and bottom face (essentially R), creating a cam effect. During each take-up advance of the fabric, the top face is pulled an incremental distance more than the other two fabrics causing the top face to be a percentage longer. This in effect weaves the TABI fabric on a curvature. At the time, an idler roll of 6.38 inch diameter was being used. By adding the thickness to the idler roll, a 2.0% increase in length along the outer surface is attained. Translated into linear length, the top face sheet of a 48 inch panel may actually be nearly 49.0 inches. When in a flat position, the excess top face fabric would be more pronounced in the center (protrusions), and less at the ends where there is relief from the cut edges (flat). Minimizing the cam effect could be achieved by reducing the idler roll diameter. The existing idler was replaced with one of 2.30 inch, and panel 6 was woven. No other changes were made to the loom set-up or weave design.

Both panels 5 and 6 were removed from the loom and further processed. After heat-cleaning, the panels were compared for flatness across the top face. The surface of the angle interlock fabric had improved greatly in panel 6 suggesting that the combination of the large diameter idler roll and the fabric thickness stack contributed to the protrusion-effect. The panel appears uniformly flatter along the length, though a few pairs of cells did contain protrusions less severe than those seen in panels 2, 3, or 4.

Invention's Physical Characteristics:

In its final heat-cleaned insulated condition, the flexible ceramic thermal protection system exhibits the following physical characteristics:

TABLE 2

ANGLE INTERLOCK PHYSICAL CHARACTERISTICS HEAT-CLEANED, INSULATED CONDITION

| Fiber Counts | Top Face | Rib Fabric | Bottom Face |
|---|---|---|---|
| Warp (yd/in) | 112.0 | 28.0 | 28.0 |
| Fill (yd/in) | 84.0 | 26.5 | 30.0 |
| Fabric Thickness (in) | 0.030 | 0.009 | 0.010 |
| Overall Panel Thickness (in) | | 1.03 | |
| Structure Areal Weight (oz/yd$^2$) | | 121.60 | |
| Structure Density (lb/ft$^3$) | | 9.84 | |

The insulation structure also demonstrates sufficient flexibility to conform to contoured curvatures.

EXPERIMENTAL TEST CONDITIONS

Radiant Heat Exposure Test—A 1 atm Radiant Lamp Test Apparatus as reported in Reference 11 was used to precondition all test articles. The primary purpose of this procedure was to expose the surface fabric of the different TPS constructions to a surface conditioning temperature prior to any acoustic exposure. Various temperatures and times were used. Temperatures of 1200° F., 2000° F., and 2500° F. were used depending on the particular ceramic fabric. Exposure times were 10 min at 1200° F., 2 min at 2000° F. and 2 min at 2500° F. All the test articles were cooled to room temperature (about 20° C.) before remounting into the aeroacoustic test configuration. Also the sample size (6.5 in by 7.5 in long by 1.0 in deep) was the same for both the radiant heat test and the mini -wind tunnel test facility which minimized handling and mounting damage to the ceramic blankets being evaluated.

Mini -Wind Tunnel Test Facility (MWTF)—Aeroacoustic testing was conducted in a small wind tunnel test apparatus specifically designed to simulate oscillating air loads on the surface of the AFRSI or TABI articles. A full description of the design, operational and performance characteristics are detailed in the C. F. Coe references cited above.

This MWTF provided the advantage of small sample size, rapid start or stop capability, constant visual observation, and excellent control of aerodynamic conditions. For this study, all test articles were exposed to a dynamic pressure of 510 lb per sq ft, total pressure setting of 6 psi, a fluctuating pressure of 2.7 psi, and an overall sound pressure level of 170 decibels. The surface area exposed to this condition was 3.5 in by 5 in. Typically, the TABI test panels had three complete cores exposed to this environment in the parallel direction and at least four complete cores tested in perpendicular flow direction. Also, a rotor speed of 100 revolutions per sec was selected because of the superior waveform and amplitude measured at this condition. Prior to insertion of the test article into the MWTF, a calibration panel was inserted into the test section to simulate the entry-like aerodynamic conditions indicated. A schematic of the MWTF is represented in FIG. 24.

Table 3 lists the integrally-woven core blanket insulation of the present invention.

Table 4 provides additional measurements for the surface weave geometry of the structure of the present invention.

TABLE 3

FLEXIBLE CERAMIC TPS CONSTRUCTION

| Sewn, Quilted Blanket | OML Fabric | OML Thread | Insulation | Coating |
|---|---|---|---|---|
| Uncoated AFRSI | Silica | Silica | Silica | None |
| Coated AFRSI | Silica | Silica | Silica | C-9 Coating |

| Integrally Woven Core Blanket | Yarn | Insulation | Face Fabric Style |
|---|---|---|---|
| TABI-1800 SP | 1800 de Silicon Carbide | Silica | Single-Ply Plain Weave |
| TABI-600 Al | 600 de Silicon Carbide | Alumina | Angle-Interlock |
| TABI-600 LL | 600 de Silicon Carbide | Alumina | Layer-to-Layer |

TABLE 4

SURFACE WEAVE GEOMETRY OF TOP FACE FABRIC

| | | | Yarn Density | | | |
|---|---|---|---|---|---|---|
| TABI | Fiber Diameter $\mu m$ | Face Fabric Thickness, in. | Warp epi | Fill, ppi | Filaments/ Strand | Crimp Factor, % |
| 1800 de SiC, Single Ply | 15 | 0.0107 | 16.0 | 24.0 | 500 | 8 |
| 600 de SiC, Single Ply | 12 | 0.009 | 28.0 | 29.0 | 250 | 3.5 |
| 600 de SiC, Angle Interlock | 12 | 0.032 | 112.0 | 83.5 | 250 | 9.5 |
| 600 de SiC, Layer-to-Layer | 12 | .029 | 112.0 | 61.5 | 250 | 7.5 |

While only a few embodiments of the invention have been shown and described herein, it will become apparent to those skilled in the art that various modifications and changes can be made in the fabrication of a flexible ceramic thermal protection system having an angle interlock construction which is resistant to high aeroacoustic noise and at high temperatures without departing from the spirit and scope of the present invention. All such modifications and changes coming within the scope of the appended claims are intended to be carried out thereby.

We claim:

1. An improved high temperature flexible three dimensional fabric structure comprising:
    a top fabric layer comprising multiple layers of continuous woven ceramic fabric;
    a single layer woven ceramic fabric surface for a bottom face fabric surface;
    a single layer woven ceramic rib fabric which forms an angled truss configuration between the top surface and bottom surface creating an open volume;
    a high temperature stable ceramic insulation located in and filling the open volume between the top face and bottom face and in contact with the surface of the rib truss fabric,
    wherein the top face fabric is woven in an angle interlock mode such that the outer top multilayer surface is an integral smooth tightly woven face sheet and wherein the structure has enhanced resistance to aeroacoustic noise up to 170 decibels and enhanced resistance to heat at temperatures up to about 2500° F.

2. The improved fabric structure of claim 1 wherein the angled truss configuration is at an angle of between about 40 and 80 degrees or about 110 to 140 degrees from the top face surface and bottom face surface.

3. The improved fabric structure of claim 2 wherein the angle is between about 40 and 65 degrees or about 115 to 140 degrees.

4. The improved fabric structure of claim 1 wherein the top face fabric, bottom face fabric and the single layer rib fabric are each independently selected from the group consisting of silicon carbide, aluminoborosilicate, silica, silicon-titanium-carbon-oxygen, silicon nitride, and carbon nitride.

5. The improved fabric structure of claim 1 wherein the high temperature ceramic insulation is selected from the group consisting of silica, alumina, aluminoborosilicate, silicon carbide, silicon nitride, silicon boride, silicon-titanium-carbon-oxygen, and silicon boronitride.

6. The improved fabric structure of claim 1 wherein the top multi layer fabric, the bottom layer fabric and single layer rib fabric comprise yarn of silicon carbide of between about 500 to 2000 denier, the single layer rib fabric yarn is at an angle of between about 40 and 80 degrees from the surface of the top layer fabric and the ceramic insulation is selected from silica or alumina.

7. The improved fabric structure of claim 1 which is also stable to an oscillating pressure of about 3 psi.

8. The improved fabric structure of claim 4 wherein the too fabric layer, bottom fabric layer, and rib structure all comprise silicon carbide.

9. The improved fabric structure of claim 1 wherein the top fabric layer which is directly exposed to the heat and aeroacoustic noise comprises a high temperature ceramic fiber, the rib fabric and the bottom fabric layer which are not directly exposed to the environmental heat and aeroacoustic noise independently comprise a lower temperature ceramic fiber relative to the top fabric layer fibers.

10. The structure of claim 1 wherein the thickness of the structure is between about 0.5 and 3 in.

11. A composite multilayered flexible blanket insulation comprising a top woven fabric layer comprising multiple layers of continuous woven fabric, a bottom woven fabric layer, high temperature insulation layer, and optional reflection shield layers and spaces, all secured using a woven ceramic fabric wherein:
    the top fabric and bottom fabric layers are secured to each other by a rib structure of woven ceramic fabric at an angle of from between about 45 and 135 degrees from the surface of either the top fabric layer or bottom fabric layer, thus creating triangular prism or trapezoidal prism shaped spaces between the top fabric layer and bottom fabric layer and the ceramic insulation therewithin has correspondingly triangular prism or trapezoidal prism shapes within the created spaces, wherein said composite insulation is able to withstand an aeroacoustic environment up to about 170 decibels and a temperatures up to about 2500° F.

12. The blanket insulation of claim 11 wherein, the top fabric layer, bottom fabric layer and rib structure are each independently selected from the group consisting of from silicon carbide, silica, aluminoborosilicate, silicon-titanium-carbon-oxygen, silicon nitride, and carbon nitride.

13. The blanket insulation of claim 12 wherein the high temperature insulation is selected from silica or alumina in fiber form.

14. The blanket insulation of claim 13 wherein the rib structure is at an angle of about 60 degrees to the top fabric layer.

15. The blanket insulation of claim 11 which is also stable to oscillating pressure of about 3 psi.

16. The blanket insulation of claim 12 wherein top fabric layer, bottom fabric layer, and rib structure all comprise silicon carbide.

* * * * *